(12) United States Patent
Ito et al.

(10) Patent No.: US 10,613,197 B2
(45) Date of Patent: Apr. 7, 2020

(54) ANTENNA SPECIFICATION ESTIMATION DEVICE AND RADAR DEVICE

(71) Applicant: Mitsubishi Electric Corporation, Tokyo (JP)

(72) Inventors: Toshihiro Ito, Tokyo (JP); Toshio Wakayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 434 days.

(21) Appl. No.: 15/517,328

(22) PCT Filed: Oct. 30, 2014

(86) PCT No.: PCT/JP2014/005510
§ 371 (c)(1),
(2) Date: Apr. 6, 2017

(87) PCT Pub. No.: WO2016/067321
PCT Pub. Date: May 6, 2016

(65) Prior Publication Data
US 2017/0299694 A1    Oct. 19, 2017

(51) Int. Cl.
*G01S 7/40* (2006.01)
*G01S 13/42* (2006.01)
*G01S 13/02* (2006.01)

(52) U.S. Cl.
CPC .......... *G01S 7/4004* (2013.01); *G01S 7/4026* (2013.01); *G01S 13/42* (2013.01); *G01S 2007/4091* (2013.01); *G01S 2013/0245* (2013.01)

(58) Field of Classification Search
CPC ........ G01S 7/40; G01S 7/4004; G01S 7/4008; G01S 7/4021; G01S 7/4026; G01S 2007/4091
See application file for complete search history.

(56) References Cited

U.S. PATENT DOCUMENTS 5,063,529 A    11/1991  Chapoton
5,432,520 A *  7/1995  Schneider ............... F41G 7/007
                                                342/357.27
(Continued)

FOREIGN PATENT DOCUMENTS

JP    S57-097704 A    6/1982
JP    H06-013813 A    1/1994
(Continued)

OTHER PUBLICATIONS

International Search Report issued in PCT/JP2014/005510; dated Feb. 3, 2015.
(Continued)

*Primary Examiner* — Peter M Bythrow
(74) *Attorney, Agent, or Firm* — Studebaker & Brackett PC

(57) ABSTRACT

There is disclosed a radar device including: an information storage to store position information of a mobile entity existing independently of the radar device; and a transmission array antenna having a transmission sub-array antenna which transmit a signal to the mobile entity. The radar device estimates a parameter such as arrangement relation and a transmission phase of the sub-array antenna by using amplitude phase information in a plurality of reception sub-array antennas that have received reflected signals from the mobile entity with respect to the reception signals, and position information of the mobile entity that is stored in an information storage, and performs operation of radar using the estimated parameter. With this configuration, there can be obtained a radar device that is able to estimate a parameter such as arrangement relation and a transmission phase of a sub-array antenna without installing a transmission source of reference radio waves.

12 Claims, 11 Drawing Sheets

(56) References Cited

U.S. PATENT DOCUMENTS

| | | | | |
|---|---|---|---|---|
| 5,530,449 | A * | 6/1996 | Wachs | H01Q 3/267 342/174 |
| 5,546,090 | A * | 8/1996 | Roy, III | H01Q 1/246 342/174 |
| 6,339,399 | B1 | 1/2002 | Andersson et al. | |
| 6,462,704 | B2 * | 10/2002 | Rexberg | H01Q 3/267 342/174 |
| 6,480,153 | B1 * | 11/2002 | Jung | H01Q 3/267 342/174 |
| 6,646,598 | B1 * | 11/2003 | Timothy | G01S 7/4026 342/359 |
| 6,771,216 | B2 * | 8/2004 | Patel | H01Q 3/267 342/174 |
| 6,853,330 | B1 * | 2/2005 | Krikorian | G01S 7/4026 342/149 |
| 7,218,273 | B1 * | 5/2007 | Webster, Jr. | G01S 7/4026 342/147 |
| 7,486,229 | B1 * | 2/2009 | Govoni | G01S 7/4004 342/160 |
| 2003/0058166 | A1 * | 3/2003 | Hirabe | H01Q 3/267 342/368 |
| 2006/0114147 | A1 * | 6/2006 | Boonstra | G01S 3/023 342/174 |
| 2007/0069945 | A1 | 3/2007 | Weese | |
| 2008/0036648 | A1 * | 2/2008 | Green | G01S 7/4017 342/174 |
| 2009/0167591 | A1 * | 7/2009 | Abbett | G01S 5/0027 342/37 |
| 2011/0205130 | A1 * | 8/2011 | Mrstik | H01Q 3/267 343/703 |
| 2011/0267216 | A1 * | 11/2011 | Smith | G01S 3/023 342/30 |
| 2012/0001793 | A1 * | 1/2012 | Jacobs | G01S 7/4004 342/146 |
| 2016/0259043 | A1 * | 9/2016 | Schar | G01S 13/723 |

FOREIGN PATENT DOCUMENTS

| | | |
|---|---|---|
| JP | H10-503892 A | 4/1998 |
| JP | 2005-535897 A | 11/2005 |
| JP | 2007-097166 A | 4/2007 |
| JP | 2009-192476 A | 8/2009 |
| JP | 2013-192179 A | 9/2013 |

OTHER PUBLICATIONS

Hee-Young Park et al.; "Generalization of the Subspace-Based Array Shape Estimations"; IEEE Journal of Oceanic Engineering; Jul. 2004; pp. 847-856, vol. 29, No. 3.

Volkan Cevher et al.; "Acoustic Node Calibration using a Moving Source"; IEEE Transactions on Aerospace and Electronic Systems; Apr. 2006; pp. 585-600, vol. 42, No. 2.

* cited by examiner

ANTENNA SPECIFICATION ESTIMATION DEVICE AND RADAR DEVICE

TECHNICAL FIELD

The present invention relates to an antenna specification estimation device estimating specifications of an array antenna, and also relates to a radar device performing operation of radar.

BACKGROUND ART

A radar device, using a distributed array antenna, is able to obtain high spatial resolution by performing beam forming, in which a digital beam forming (DBF) process or the like is implemented on output of a plurality of arranged sub-array antennas. The sub-array antenna is an array antenna constituted by a plurality of element antennas. The distributed array antenna is formed by arranging a plurality of the sub-array antennas to perform phase control. An antenna aperture size of the distributed array antenna is equivalent to an area where the plural sub-array antennas are arranged.

In the radar device using the distributed array antenna, it is required to perform processes for accurate estimation of antenna specifications, such as the arrangement relation among the sub-array antennas, the directionality of the aperture plane of the sub-array antennas, a relative transmission phase of the sub-array antennas, and the like. Those processes enable the radar device to achieve beam orientation directed to an accurate direction using the DBF, and accurate angle measuring processing. Conventionally, the estimation of the antenna specifications is performed by arranging a transmission source of reference radio waves whose position information has been acquired highly-accurately, and then receiving transmission radio waves from the transmission source (for example, position estimation of a sensor in Non-patent Literature 1 mentioned later). Specifically, the amplitude and phase of a signal from the transmission source, each of whose position has been acquired highly-accurately, are measured by each sub-array antenna, and a steering vector matching the measured amplitude and phase is searched for, thereby identifying the arrangement of a corresponding sub-array antenna.

CITATION LIST

Non-patent Literature 1: Hee Young-Park, etc, "Generalization of the Subspace-Based Array Shape Estimations", IEEE JOURNAL OF OCEANIC ENGINEERING, Vol. 29, No. 3, July 2004.

SUMMARY OF INVENTION

In the estimation of antenna specifications performed by the conventional radar device, the arrangement relation of sub-array antennas is estimated by installing a transmission source of reference radio waves, whose position has been acquired highly-accurately. However, in the conventional radar device, when a sub-array antenna is moved or new one is added during operation, it is required to detect the position of such sub-array antenna. Large load is needed for installing a transmission source of reference radio waves during the operation. Therefore, it is needed to obtain an antenna specification estimation device that is able to flexibly estimate the arrangement relation of sub-array antennas even when the arrangement of the sub-array antennas changes during the operation, and also obtain a radar device including the above-mentioned antenna specification estimation device.

The present invention has been devised for solving the above-described issues. The object of the present invention is to obtain an antenna specification estimation device that is capable of estimating antenna specifications, such as the arrangement relation and transmission phase of sub-array antennas constituting a distributed array antenna, without installing a transmission source of reference radio waves, and also obtain a radar device including the above-mentioned antenna specification estimation device.

An antenna specification estimation device according to the present invention includes: a transmission antenna having a transmission sub-array antenna which transmit a signal to a mobile entity existing independently of the antenna specification estimation device; a reception array antenna having a plurality of reception sub-array antennas each of which receives a signal reflected from the mobile entity; a calculator to calculate amplitude phase information indicating amplitude and phases of the signal received by the reception array antenna, the amplitude and the phases being observed in the reception sub-array antennas; an information storage to store position information of the mobile entity, the position information changing with time; and an information estimator to estimate a parameter of a sub-array antenna included in the plurality of reception sub-array antennas by using the phase information calculated by the calculator and the position information stored in the information storage, wherein the parameter of the sub-array antenna indicates a position coordinate of the sub-array antenna, or an aperture plane direction of the sub-array antenna, or a transmission phase of the sub-array antenna, or a combination of any two of the position coordinate, the aperture plane direction, and the transmission phase, or all of the position coordinate, the aperture plane direction, and the transmission phase, and wherein the information estimator estimates the parameter of the sub-array antenna on a basis of consistency of relation between amplitude phase information pieces and position information pieces, each of which obtained by observation on different target directions.

According to the antenna specification estimation device of the present invention, antenna specifications, such as the arrangement relation and transmission phase of sub-array antennas constituting a distributed array antenna, can be estimated without installing a transmission source of reference radio waves.

DESCRIPTION OF PREFERRED EMBODIMENTS

Embodiments of the present invention will be described in detail below with reference to the drawings.

Embodiment 1

Figure 1:
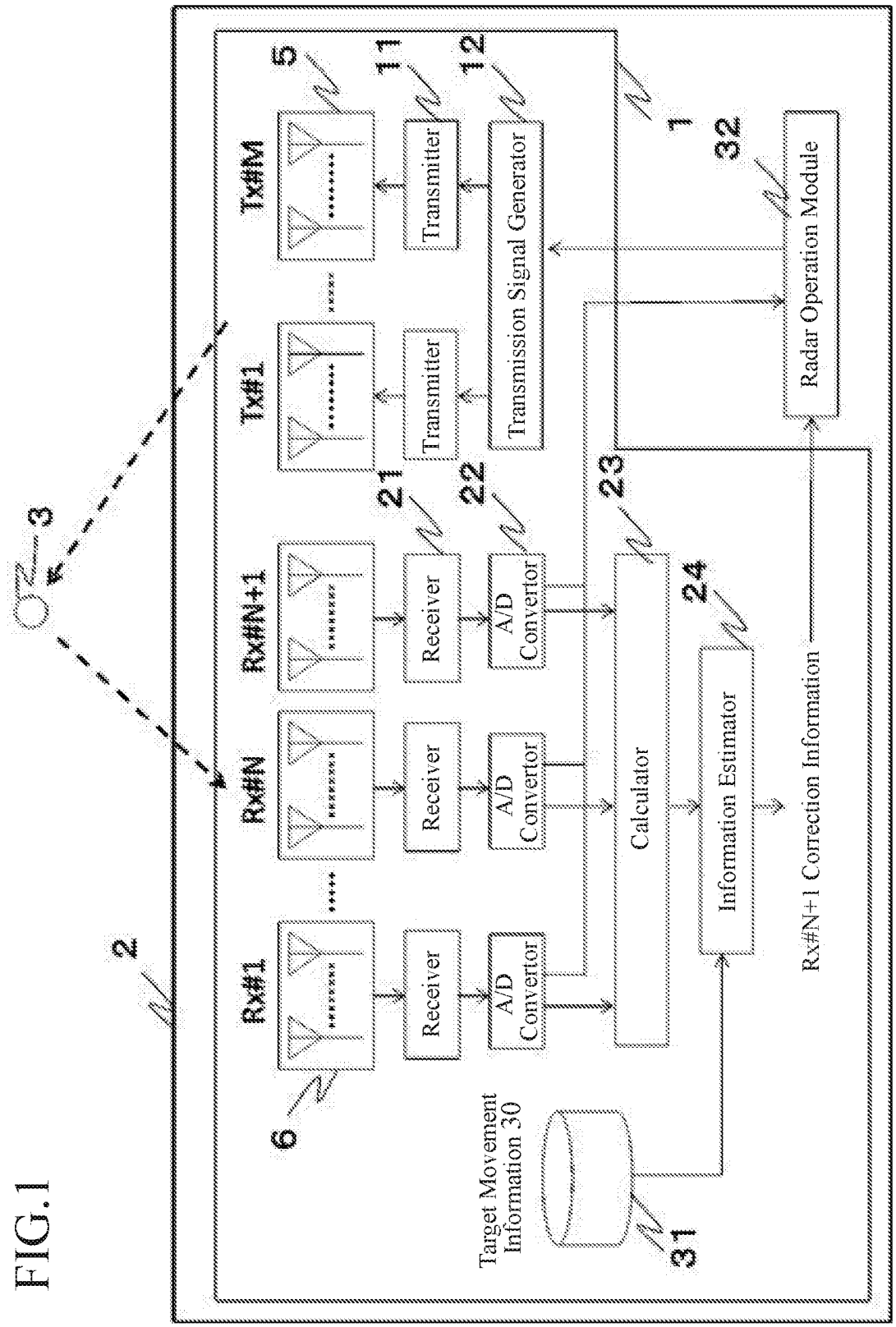
FIG. 1 is a configuration diagram of an antenna specification estimation device 1 and a radar device 2 according to Embodiment 1 of the present invention.

An antenna specification estimation device 1 and a radar device 2 according to Embodiment 1 of the present invention will be described with reference to FIGS. 1 and 2. FIG. 1 illustrates a configuration of the antenna specification estimation device 1 and the radar device 2 according to the Embodiment 1 of the present invention. FIG. 1 illustrates an example where the (N+1)th reception sub-array antenna 6 is used as a correction target from among N+1 reception sub-array antennas 6 constituting a reception distributed array antenna. Although, in general, a sub-array antenna is constituted by a plurality of element antennas, it can be constituted by a single antenna. In addition, the number of element antennas constituting each sub-array antenna may differ among different sub-array antennas. When a signal is received in the antenna specification estimation device 1 and the radar device 2, a single pair of amplitude and phase value is observed for a single sub-array antenna.

In FIG. 1, the antenna specification estimation device 1 and the radar device 2 of the present invention are constituted by a reception array and a transmission array. The transmission array includes transmission sub-array antennas 5 being M sub-array antennas, a transmitter 11, and a transmission signal generator 12. A transmission signal generated by the transmission signal generator 12 is subjected to frequency conversion, amplification, and the like, that are performed by the transmitter 11 as necessary, and emitted from each of the transmission sub-array antennas 5 toward a mobile target 3. A signal reflected by the mobile target 3 being a mobile entity is received by the reception array constituted by reception sub-array antennas 6 being N+1 sub-array antennas, subjected to amplification and frequency conversion that are performed by a receiver 21 as necessary, and then, subjected to A/D conversion performed by an A/D convertor 22 to generate a digital signal. A calculator 23 calculates information of relative amplitude and phase with respect to reception signals of the reception sub-array antennas 6. An information estimator 24 estimates correction information being a parameter of the (N+1)th reception sub-array antenna 6 as the correction target by using relative amplitude and phase information pieces corresponding to a plurality of observations that have been calculated by the calculator 23, and also using target movement information pieces 30 corresponding to the plurality of observations that are included in an information storage 31. A radar operation module 32 performs operation of radar by using the correction information being a parameter of the (N+1)th reception sub-array antenna 6 as the correction target, that has been estimated by the information estimator 24. In the diagrams mentioned thereinafter, the same signs denote the same or corresponding parts.

Next, each component part of the antenna specification estimation device 1 and the radar device 2 in FIG. 1 will be described in more detail with referring to a flowchart in FIG. 2 that illustrates processing in the antenna specification estimation device 1 and the radar device 2.

Figure 2:
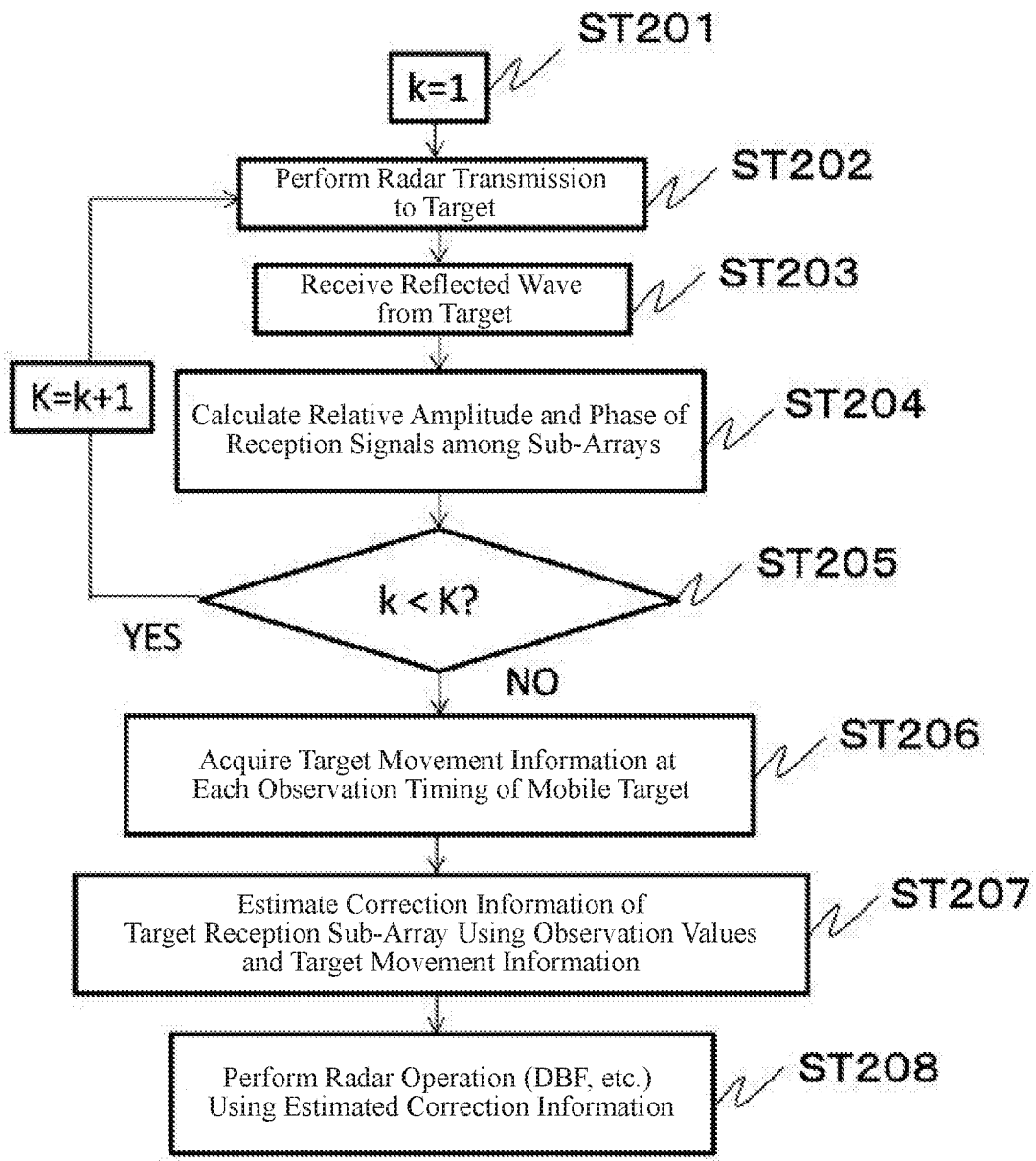
FIG. 2 is a flowchart illustrating a flow of processing of the antenna specification estimation device 1 and the radar device 2 according to the Embodiment 1 of the present invention.

FIG. 2 is a flowchart illustrating a flow of processing of the antenna specification estimation device 1 and the radar device 2. In FIG. 2, for the first observation k=1 (ST201), radar transmission to the mobile target 3 is performed (ST202). This is equivalent to a process of emitting a transmission signal generated by the transmission signal generator 12 from each of the transmission sub-array antennas 5 to the mobile target 3 as described above. For the transmission signal, any signal waveforms can be assumed, such as unmodulated pulse, frequency modulated (FM) chirped pulse, and frequency modulated continuous wave (FM-CW), each of which is commonly used for radar. The transmission signal is transmitted from each element antenna in the transmission sub-array antennas 5. During the signal transmission, the antenna specification estimation device 1 and the radar device 2 may perform phase control of element antennas in the transmission sub-array antennas 5. When the phase control is performed, a transmission beam is formed at each of the transmission sub-array antennas 5. The transmitter 11 may perform phase control among the transmission sub-array antennas 5. In this case, transmission beams are formed by the whole transmission array.

Next, a reflected wave from the mobile target 3 is received by each of the reception sub-array antennas 6 (ST203). At this time, similarly to the transmission sub-array antennas 5, also in each of the reception sub-array antennas 6, reception beam forming may be performed in each of the reception sub-array antennas 6 by the phase control of the element antennas. In the k-th observation, the following time-sampled reception signal $x_k(t)$ is acquired through the receiving process.

$$x_k(t) = a(\theta_k, \varphi_k)s(t) + n(t) \quad (1)$$

$$a(\theta_k, \varphi_k) = [a_1(\theta_k, \varphi_k) \ldots a_n(\theta_k, \varphi_k) \ldots a_{N+1}(\theta_k, \varphi_k)]^T \quad (2)$$

In the formulas above, $a(\theta_k, \varphi_k)$, $\theta_k$, $\varphi_k$, and $s(t)$ denote a steering vector of the reception array, a target elevation angle in the k-th observation, a target azimuthal angle in the k-th observation, and a reception signal waveform, respectively. In addition, $n(t)$ denotes a noise component and T denotes transposition.

Subsequently, information of relative amplitude and phase among reception signals of the reception sub-array antennas 6 is calculated (ST204). This process corresponds to the calculator 23 in FIG. 1. In this process, amplitude phase information $y(k)$ of each element of the reception signal $x_k(t)$ in the formula (1) is calculated. Several methods can be considered as calculation methods thereof. For example, there is a method of extracting the reception signal $x_k(t)$ at an arbitrary timing $t_0$, and using it as the information $y(k)$.

$$y(k)=x_k(t_0) \quad (3)$$

Alternatively, for example, there can be considered a method of performing calculation of correlation with a reception signal $x_{k,n0}(t)$ of an arbitrary $n_0$-th reception sub-array antenna 6, as in the following formula (4).

$$y(k)=[E[x_{k,1}(t)x_{k,n0}*(t)] \ldots E[x_{k,n}(t)x_{k,n0}*(t)] \ldots E[x_{k,N+1}(t)x_{k,n0}*(t)]]^T \quad (4)$$

In the formula (4), * and E[ ] denote complex conjugation and expected value calculation, respectively. In any case, relative amplitude and phase of reception signals among the reception sub-array antennas 6 are calculated by commonly-used calculation of extracting relative amplitude and phase among signals. If the relative amplitude and phase of reception signals among the reception sub-array antennas 6 can be obtained, calculation methods other than the formula (3) or the formula (4) can be used.

As indicated in FIG. 2, the subsequent processing from ST202 to ST204 is executed K times in total (ST205). Since the mobile target 3 is constantly moving, information of relative amplitude and phase of reception signals among the sub-array antennas is observed for different target directions every K observation.

Subsequently, for each of time timings at which the K observations have been performed, the target movement information 30 stored in the information storage 31 is acquired (ST206). The target movement information 30 stored in the information storage 31 includes three-dimensional position information and speed information of the mobile target 3 at each time. As the mobile target 3, an aircraft, a ship, a vehicle, or the like, which is equipped with a global positioning system (GPS) is considered for example. It is considered that GPS information pieces for the K observations are saved during the K observations, and after the observations, the GPS information pieces are input off-line to the information estimator 24. Besides this, when a civilian aircraft is used as the mobile target 3, an Automatic Dependent Surveillance-Broadcast (ADS-B) signal emitted from the aircraft itself can be used as the target movement information 30 of the mobile target 3 by receiving and decoding the signal. Alternatively, a signal of an automatic identification system (AIS) equipped in a ship can be used as the target movement information 30 of the mobile target 3 by receiving and demodulating the signal. Note that, the ADS-B signal is a signal emitted from an aircraft independently of the radar device of the present embodiment, and can be used without performing pre-arrangement with the aircraft. In other words, in the present embodiment, a mobile entity, which does not perform pre-arrangement with the antenna specification estimation device 1 and the radar device 2, is used as the mobile target 3. The mobile target 3 is a mobile entity existing independently of the antenna specification estimation device 1 and the radar device 2. In the present embodiment, by using position information of the independently-existing mobile entity, antenna specifications such as the arrangement relation and transmission phase of sub-array antennas constituting a distributed array antenna can be estimated without using a transmission source of reference radio waves necessary for conventional techniques.

Next, by using K observation values that have been acquired so far, and the target movement information 30 of the mobile target 3 that is stored in the information storage 31, correction information being a parameter of the reception sub-array antenna 6 as the correction target ((N+1)th) is estimated (ST207). A case of using maximum likelihood estimation as estimation processing will now be described. The estimation of correction information is processing of solving a minimization problem of an evaluation function $J(\xi)$ that is based on log likelihood indicated in the following formula (5), and estimating correction information $$J(\xi) = \sum_{k=0}^{K-1} tr\left\{\left(I - \frac{1}{N+1}a'(\theta_k, \phi_k, \xi)a'^N(\theta_k, \phi_k, \xi)\right)y(k)y^N(k)\right\} \quad (5)$$

$$\xi' = \underset{\xi}{\operatorname{argmin}} J(\xi) \quad (6)$$

In the formula (5), $a'(\theta_k, \varphi_k, \xi)$ denotes a calculation value of a steering vector, and $\xi$ denotes a vector having estimation target correction information as an element. According to the formula (5), the amplitude phase information $y(k)$ of each element of the reception signal $x_k(t)$ is projected on a noise space excluding the steering vector $a'(\theta_k, \varphi_k, \xi)$. When the steering vector $a'(\theta_k, \varphi_k, \xi)$ is toward an accurate direction, $J(\xi)$ becomes the minimum value. Therefore, by obtaining correction information $\xi'$ where $J(\xi)$ becomes the minimum, correction information being a parameter of the reception sub-array antenna 6 as the correction target ((N+1)th) can be estimated. Besides the formula (5), by obtaining $\xi$ that maximizes the correlation of the amplitude phase information $y(k)$ and the steering vector $a'(\theta_k, \varphi_k, \xi)$ the correction information can be estimated. Here, when an estimation target is assumed to be a position $(x_{N+1}, y_{N+1}, z_{N+1})$ of the (N+1)th reception sub-array antenna, an aperture plane direction $(\Delta\theta_{N+1}, \Delta\varphi_{N+1})$, and a transmission phase $\psi_{N+1}$, $\xi$ can be obtained as follows.

$$\xi=[x_{N+1}y_{N+1}z_{N+1}\Delta\theta_{N+1}\Delta\psi_{N+1}\varphi_{N+1}]^T \quad (7)$$

The transmission phase indicates a phase component generated in a circuit during a period from when a signal is received on the aperture of the reception sub-array antenna 6 to when the phase of the signal is detected in the radar device.

At this time, a sub-array antenna factor $a'_n(\theta_k, \varphi_k, \xi)$ corresponding to the n-th sub-array antenna in the steering vector $a'(\theta_k, \varphi_k, \xi)$ is as represented by the following formula (8).

$$a'_n(\theta_k, \phi_k, \xi) = \quad (8)$$

$$G_n(\theta_k, \phi_k, \Delta\theta_n, \Delta\phi_n) \cdot \exp\left\{j\frac{2\pi f}{c}d_n^T u(\theta_k, \phi_k)\right\} \cdot \exp(j\psi_n)$$

In the formula (8), $G_n(\theta_k, \varphi_k, \Delta\theta_n, \Delta\varphi_n)$ denotes a sub-array antenna gain obtainable in a case where a signal has arrived from $\theta_k$, $\varphi_k$ when an aperture plane inclination is $\Delta\theta_n$, $\Delta\varphi_n$. In addition, $d_n$ denotes a sub-array antenna position vector in the following formula (9), and $u(\theta_k, \varphi_k)$ denotes an arrival direction vector described in a formula (10). In addition, the representation of the arrival direction vector in the formula (10) generally varies depending on positions taken in a coordinate system.

$$d_n=[x_{N+1}y_{N+1}z_{N+1}]^T \quad (9)$$

$$u(\theta_k, \varphi_k)=[\cos\theta_k\cos\varphi_k\cos\theta_k\sin\varphi_k\sin\theta_k]^T \quad (10)$$

$\theta_k, \varphi_k$ can be acquired from target movement information 30 in the k-th observation, that is stored in the information storage 31, and position information of the distributed array antenna. Therefore, by calculating the formula (8) for each observation and each of the reception sub-array antennas 6 while varying $\xi$, and also searching for the minimum value of $J(\xi)$ in the formula (5), an estimation value $\xi'$ of correction information can be obtained. In this searching, any method can be used for varying $\xi$.

Finally, the radar operation module 32 performs radar operation using the acquired estimation value $\xi'$ of the correction information. High spatial resolution can be obtained by performing the DBF processing or the like on output of sub-array antennas to perform beam forming (ST208).

In the estimation method of the present invention, a principle of estimating the direction of an aperture plane of a sub-array antenna is similar to conventional beam space angle measuring processing, such as amplitude monopulse and conical scanning. In normal measurement of the beam space angle, beams are formed in different directions with respect to a target located in the same position, and a plurality of reception signals corresponding to different directions in main beams are generated. After that, angle measuring is performed based on relative relation of amplitudes of reception signals of the plurality of beams. In contrast to this method, in the estimation method of the present invention, by observing the mobile target 3 over a plurality of times, K reception signals corresponding to different directions of main beams of the (N+1)th sub-array antenna are generated. At this time, the arrival direction of the mobile target 3 can be obtained from the target movement information 30 stored in the information storage 31. Thus, an estimation target of the angle measuring processing is not an arrival direction of the mobile target 3, but is a sub-array antenna aperture plane direction as a basis of the direction. As described above, according to the estimation method of the present invention, an equivalent situation to a beam space is created through a plurality of times of observations, and the target movement information 30 stored in the information storage 31 is utilize. It is capable of providing a condition where the sub-array antenna aperture plane direction can be estimated.

In addition, the target movement information 30 in observation is acquired by using a signal emitted from an aircraft or the like. Thus, the radar device of the present embodiment is able to correct the reception sub-array antennas 6 by using a signal emitted from an aircraft or the like, without setting a known target. As a result, the reception sub-array antennas 6 can be corrected without installing a known target. Also, even when a sub-array antenna is moved or added, the array antenna can be flexibly corrected.

The position estimation of sub-array antennas uses a principle similar to triangulation. In the triangulation, angles to a measurement target from a plurality of observation points are obtained, and a position at which the plurality of pieces of angle information has consistency is used as a position of the measurement target. In the estimation method of the present invention, individual target directions in the K observations are equivalent to angles toward the measurement target from the plurality of observation points in the triangulation, and a phase relation among sub-array antennas in which the plurality of target directions has consistency is searched for. Furthermore, a position $d_{N+1}$ of the (N+1)th reception sub-array antenna 6 corresponding to the phase relation is obtained as a result of position estimation.

Although the method based on the maximum likelihood estimation has been described here, the estimation of correction information may be performed based on other methods. For example, by using a least-square method, an evaluation function using a calculation value of a steering vector in the formula (8) can be created similarly to the maximum likelihood estimation, and the estimation of correction information can be performed for solving a minimization problem of the created evaluation function.

In addition, the distributed array antenna is required to identify not only the arrangement relation among sub-array antennas, but also the directionality of an antenna aperture plane of each sub-array antenna in order to observe the same direction in all the sub-array antennas. However, in a conventional radar device, antenna specification estimation processing of estimating the directionality of an antenna aperture plane is not performed together with estimation processing of a position of each sub-array antenna. In contrast, the estimation method of the present embodiment is capable of performing antenna specification estimation processing of estimating the directionality of an antenna aperture plane and also performing estimation processing of a position of each sub-array antenna.

In the above embodiment, it is assumed that the position, the aperture plane direction, and the transmission phase of a sub-array antenna are all unknown as indicated in the formula (7). Alternatively, a case in which one or two of those parameters is/are unknown can also be supported. For example, if the sub-array antenna position and the transmission phase are already known, and only an aperture plane inclination should be estimated, estimation processing is performed by setting $\xi$ in the following manner.

$$\xi = [\Delta\theta_{N+1} \Delta\varphi_{N+1}]^T \quad (11)$$

The estimated correction information is utilized in radar operation. For example, the sub-array antenna position information and the transmission phase are utilized in beam forming load, adaptive array processing, angle measuring processing, and the like. The sub-array antenna direction information is utilized for determining a phase control amount for element antennas in the sub-array antenna beam forming.

In the formula (5) of the present embodiment, the amplitude phase information y(k) of each element of a signal is used. However, if the amplitude of a reception signal in the formula (3) or (4) is constant, the amplitude phase information y(k) can be replaced with phase information. Therefore, the present embodiment includes a configuration in which the calculator 23 calculates phase information indicating the phase in the reception sub-array antennas 6 of reception signals.

As described above, the antenna specification estimation device 1 according to the Embodiment 1 of the present invention includes: the transmission antenna having the transmission sub-array antenna 5 transmitting a signal to a mobile target 3 existing independently of the antenna specification estimation device 1; the reception array antenna having a plurality of reception sub-array antennas 6 each of which receives a signal reflected from the mobile target 3; the calculator 23 to calculate amplitude phase information indicating amplitude and phases of the signal received by the reception array antenna, the amplitude and the phases being observed in the reception sub-array antennas 6; the information storage 31 to store position information of the mobile target 3, the position information changing with time; and the information estimator 24 to estimate the parameter of a sub-array antenna included in the reception sub-array antennas 6 by using the phase information calculated by the calculator 23 and the position information stored in the information storage 31. According to the antenna specification estimation device 1 of the present invention, by using the mobile target 3 being a mobile entity existing independently of the own device, antenna specifications being parameters, such as the arrangement relation and transmission phase of sub-array antennas constituting a distributed array antenna, can be estimated with lower load than that in conventional techniques without installing a transmission source of reference radio waves. In particular, there is obtained an effect of acquiring arrangement information and a transmission phase of a correction target sub-array antenna using the mobile target 3 being a mobile entity, without arranging a reference signal transmission source highly accurately, even when a sub-array antenna is added or moved in the distributed array antenna.

In addition, in the antenna specification estimation device 1 according to the Embodiment 1 of the present invention, the reception array antenna performs transmission and reception of a signal to the mobile target 3 being a mobile entity, a plurality of times, the amplitude phase information calculated by the calculator 23 is amplitude phase information pieces corresponding to a plurality of times that indicate the amplitude and phase in the plurality of sub-array antennas that correspond to signals received by the reception array antenna a plurality of times, temporally-changing position information of the mobile entity 3 that is stored in the information storage 31 is position information pieces corresponding to a plurality of times of the mobile entity 3 that correspond to reception times of signals received the plurality of times, and the information estimator 24 uses the amplitude phase information pieces corresponding to the plurality of times, as the amplitude phase information calculated by the calculator 23, uses the position information pieces corresponding to the plurality of times, as the position information stored in the information storage 31, and estimates a parameter of a sub-array antenna included in the plurality of sub-array antennas, based on consistency of relation among the amplitude phase information pieces corresponding to the plurality of times and the position information pieces corresponding to the plurality of times. In this manner, by using reception results of signals of a plurality of times, antenna specifications being parameters, such as the arrangement relation and transmission phase of sub-array antennas, can be estimated highly accurately.

In addition, in the antenna specification estimation device 1 according to the Embodiment 1 of the present invention, a parameter of a sub-array antenna is a position coordinate, or an aperture plane direction, or a transmission phase of a reception sub-array antenna 6, or a combination of any two of the position coordinate, the aperture plane direction, and the transmission phase, or all of the position coordinate, the aperture plane direction, and the transmission phase. With this configuration, information of a position coordinate, an aperture plane direction, and a transmission phase of the reception sub-array antenna 6, that is required for the operation of the radar device 2, can be smoothly acquired.

In addition, in the antenna specification estimation device 1 according to the Embodiment 1 of the present invention, the position information of the mobile target 3, that changes with time and is stored in the information storage 31, is acquired from GPS information of a mobile entity equipped with a GPS receiver, or information of an ADS-B equipped in an aircraft, or information of an AIS equipped in a ship. With this configuration, using a signal emitted from a mobile entity such as an aircraft, independently of the antenna specification estimation device 1 or the radar device, antenna specifications can be estimated without performing pre-arrangement with the mobile entity.

In addition, the radar device 2 according to the Embodiment 1 of the present invention includes the antenna specification estimation device 1 according to the Embodiment 1 of the present invention, and the radar operation module 32 for operating radar by using a parameter estimated by the information estimator 24 of the antenna specification estimation device 1. With this configuration, an estimation result of antenna specifications being parameters such as the arrangement relation and transmission phase of sub-array antennas that has been acquired in the Embodiment 1 can be used in radar operation.

Embodiment 2

In the Embodiment 1, there is a single correction target reception sub-array antenna 6. In contrast, in the present embodiment, there is a plurality of reception sub-array antennas as correction targets.

Figure 3:
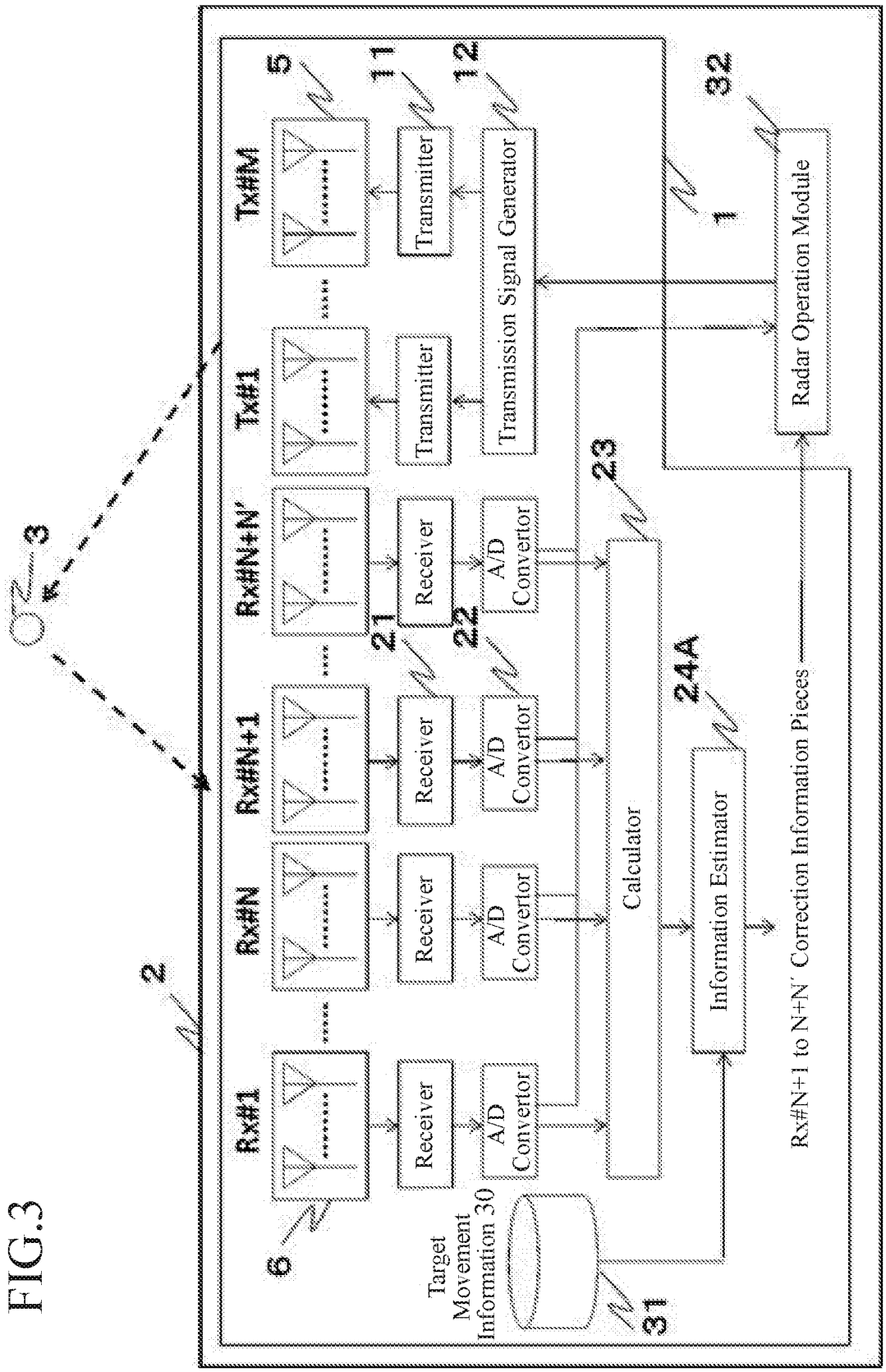
FIG. 3 is a configuration of an antenna specification estimation device 1 and a radar device 2 according to Embodiment 2 of the present invention.

An antenna specification estimation device 1 and a radar device 2 according to Embodiment 2 of the present invention will be described with reference to FIGS. 3 to 4. FIG. 3 illustrates a configuration of the antenna specification estimation device 1 and the radar device 2 according to the Embodiment 2 of the present invention. In the diagrams, the same signs denote the same or corresponding parts.

In FIG. 3, the antenna specification estimation device 1 and the radar device 2 are equipped with a reception array and a transmission array. The configuration of the transmission array is the same as that in the radar device 2 in FIG. 1. On the other hand, the reception sub-array antennas 6 of the reception array in the radar device 2 in FIG. 1 include the first to the (N+1)th reception sub-array antennas 6. In contrast, in the radar device of the present embodiment, reception sub-array antennas 6 of the reception array include the first to the (N+N')th reception sub-array antennas 6. In the present embodiment, a signal transmitted from a transmission sub-array antenna 5 and reflected by the mobile target 3 is received by the reception array constituted by N+N' reception sub-array antennas 6, subjected to amplification and frequency conversion that are performed by a receiver 21 as necessary, and after that, subjected to A/D conversion performed by an A/D convertor 22 to generate a digital signal. A calculator 23 calculates information of relative amplitude and phase of reception signals of the reception sub-array antennas 6. An information estimator 24A estimates correction information pieces being parameters of the (N+1)th to the (N+N')th reception sub-array antennas 6 as correction targets by using the relative amplitude and phase information corresponding to a plurality of observations that has been calculated by the calculator 23, and also using target movement information 30 corresponding to the plurality of observations that is stored in an information storage 31.

Figure 4:
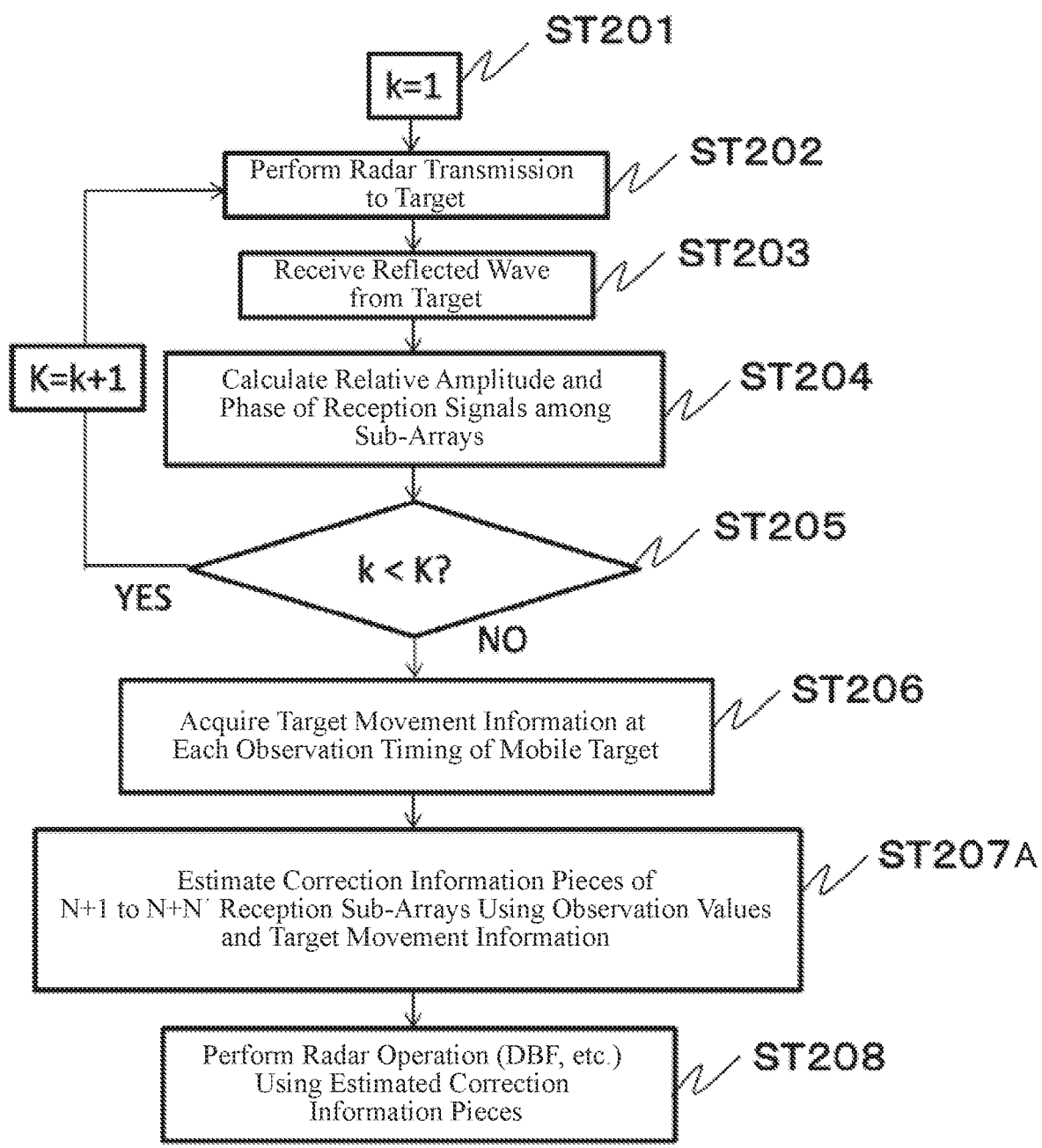
FIG. 4 is a flowchart illustrating a flow of processing of the antenna specification estimation device 1 and the radar device 2 according to the Embodiment 2 of the present invention.

FIG. 4 is a flowchart illustrating a flow of processing of the antenna specification estimation device 1 and the radar device 2 according to the Embodiment 2 of the present invention. In the configuration in FIG. 3 and the flowchart in FIG. 4, parts in the Embodiment 2 of the present invention that differ from the Embodiment 1 will be described.

As seen from the comparison between FIGS. 1 and 3, in the Embodiment 1, there is a single correction target, that is, the (N+1)th reception sub-array antenna 6. In contrast, in the Embodiment 2, there are N' correction targets in total, that is, the (N+1)th to the (N+N')th reception sub-array antennas 6. Aside from this, the information estimator 24 is replaced with an information estimator 24A that supports correction of a plurality of sub-array antennas.

Referring to the flowchart in FIG. 4, it can be seen at ST207A that an estimation part of correction information is targeted for plural N' sub-array antennas. Specifically, if the maximum likelihood estimation is used similarly to the description in the Embodiment 1, the estimation of correction information is implemented as a process of solving a minimization problem of an evaluation function in the formula (5). Note that, since a correction target is a plurality of sub-array antennas, a correction information vector $\xi$ is extended. In a case where only a sub-array antenna aperture plane direction is estimated, $\xi$ is given as follows.

$$\xi = [\Delta\theta_{N+1} \Delta\varphi_{N+1} \ldots \Delta\theta_{N+N'} \Delta\varphi_{N+N'}]^T \quad (12)$$

More specifically, a variable of an estimation target is increased, and correction information pieces of a plurality of sub-array antennas as correction targets is estimated by performing once a minimum value search of an evaluation function through the formula (5).

While the maximum likelihood estimation has been described as an example, the least-square method or the like can be used alternatively. In addition, position information $(x_{N+1}, y_{N+1}, z_{N+1})$ can be included in $\xi$.

As described above, the information estimator 24 of the antenna specification estimation device 1 according to the Embodiment 2 of the present invention simultaneously estimates parameters of two or more sub-array antennas included in the reception sub-array antennas 6 being a plurality of sub-array antennas.

With this configuration, there is obtained an effect of acquiring arrangement information and a transmission phase of a plurality of correction target sub-array antennas, without arranging a reference signal transmission source highly accurately, even when a sub-array antenna is added or moved in the distributed array antenna.

In addition, the radar device 2 according to the Embodiment 2 of the present invention includes the antenna specification estimation device 1 according to the Embodiment 2 of the present invention, and the radar operation module 32 to operate radar using parameters estimated by the information estimator 24A of the antenna specification estimation device 1. With this configuration, relative amplitude and phase information of sub-array antennas in each observation can be acquired, the target movement information 30 corresponding to the radar observation that is stored in the information storage 31 can also be separately acquired, and using both pieces of information, the arrangement information and transmission phase of a plurality of correction target sub-array antennas can be estimated by performing estimation processing once, and the estimation result can be used in radar operation.

Embodiment 3

In the Embodiment 2, correction information pieces as parameters of a plurality of correction target sub-array antennas are combined to perform the estimation simultaneously. In contrast, in the Embodiment 3, correction information pieces as parameters of a plurality of correction target sub-array antennas are sequentially estimated for each sub-array antenna one by one.

Figure 5:
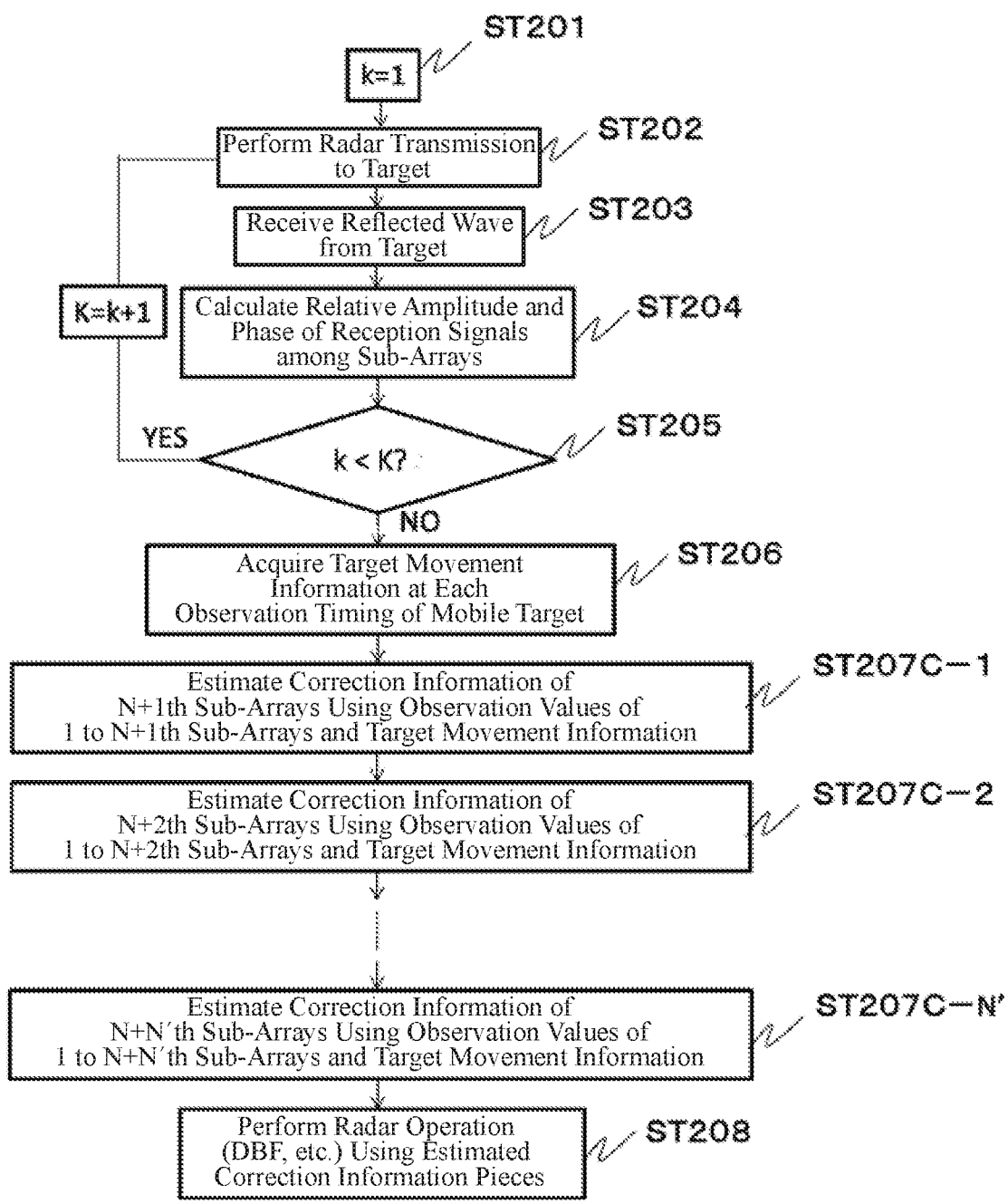
FIG. 5 is a flowchart illustrating a flow of processing of an antenna specification estimation device 1 and a radar device 2 according to Embodiment 3 of the present invention.

An antenna specification estimation device 1 and a radar device 2 according to the Embodiment 3 of the present invention will be described with reference to FIGS. 3 and 5. The configuration of the radar device that performs correction of a distributed array antenna of the present embodiment is the same as that of the radar device in the Embodiment 2, and the radar device has the configuration of the antenna specification estimation device 1 and the radar device 2 illustrated in FIG. 3. Similarly to the Embodiment 2, there are a plurality of reception sub-array antennas 6 as correction targets.

A difference between the Embodiments 2 and 3 will be described based on a flowchart in FIG. 5 that illustrates a flow of processing of the antenna specification estimation device 1 and the radar device 2 according to the Embodiment 3 of the present invention. In the Embodiment 3, similarly to the Embodiments 1 and 2, processing up to the observation of waves reflected from the targets is performed, and also the acquisition of the target movement information 30 is performed. After that, in the Embodiment 2, correction information pieces being parameters of a plurality of sub-array antennas are combined and simultaneously estimated. However, unlike the Embodiment 2, in ST207C-1 to ST207C-N' of the Embodiment 3, correction of a plurality of sub-array antennas is performed one by one.

Assuming that only sub-array antenna aperture plane directions is focused as correction targets, correction information vector $\xi$ is set as follows.

$$\xi = [\Delta\theta_{N+1} \Delta\varphi_{N+1}]^T \quad (12)$$

Furthermore, in order to estimate correction information being a parameter of the (N+1)th sub-array antenna, a calculation of the formula (5) to implement the minimum value search is performed by using a calculation value $a'_n(\theta_k, \varphi_k, \xi)$ of a steering vector and amplitude phase information y(k), each of which corresponds to the first to the (N+1)th sub-array antennas (ST207C-1). Correction information vector $\xi$ is set as follows.

$$\xi = [\Delta\theta_{N+2} \Delta\varphi_{N+2}]^T \quad (13)$$

In order to estimate correction information of the (N+2)th sub-array antenna, the formula (5) is calculated by using a calculation value $a'_n(\theta_k, \varphi_k, \xi)$ of a steering vector and amplitude phase information y(k), each of which corresponds to the first to the (N+2)th sub-array antennas (ST207C-2). Note that, when calculating the sub-array antenna factor $a'_{n+1}(\theta_k, \varphi_k, \xi)$ of the (N+1)th sub-array antenna, the correction information $\xi'$ of the (N+1)th sub-array antenna factor, which has been already estimated, is used.

After that, the estimation of correction information is sequentially performed from the (N+3)th to the (N+N')th reception sub-array antennas 6 by using correction information pieces being parameters of reception sub-array antennas 6, which have been already obtained (ST207C-3 to ST207C-N'). In this manner, the Embodiment 3 is characterized in that a plurality of sub-array antennas as correction targets are corrected one by one.

Note that, after the estimation of correction information pieces being a plurality of correction target sub-array antennas included in a plurality of sub-array antennas has been completed, an information estimator 24A can estimate again correction information being a parameter of a sub-array antenna, the estimation of which has been completed. In other words, after corrections up to the (N+N')th reception sub-array antenna 6 are completed, the correction of the (N+1)th reception sub-array antenna 6 can be further redone. In this case, unlike the first estimation, by using a calculation value $a'_n(\theta_k, \varphi_k, \xi)$ of a steering vector (as for the (N+2)th to the (N+N')th sub-array antennas, estimation results of correction information pieces have been reflected) and all the N+N' elements of amplitude phase information y(k), estimation is performed by setting a correction information vector in the formula (12) similarly to the first estimation. Such estimation can be performed using information pieces of a larger number of sub-array antennas in contrast to the first estimation. Therefore, estimation accuracy of correction information is enhanced. In this manner, in the Embodiment 3, a correction target sub-array antenna can be switched in a cyclic manner.

As described above, the information estimator 24A of the antenna specification estimation device 1 according to the Embodiment 3 of the present invention sequentially estimates, for each sub-array antenna, parameters of two or more sub-array antennas included in the reception sub-array antennas 6 being a plurality of sub-array antennas.

With this configuration, there is obtained an effect of smoothly acquiring arrangement information and a transmission phase of a plurality of correction target sub-array antennas without arranging a reference signal transmission source highly accurately, even when a sub-array antenna is added or moved in the distributed array antenna.

In addition, after estimating the parameters of two or more sub-array antennas included in the reception sub-array antennas 6 being a plurality of sub-array antennas has been completed, the information estimator 24A of the antenna specification estimation device 1 according to the Embodiment 3 of the present invention estimates again parameters of the two or more sub-array antennas, on which the estimation has been completed.

With this configuration, by using highly-reliable parameters such as arrangement information and a transmission phase of sub-array antennas, the estimation of which has been completed, parameters, such as arrangement information and a transmission phase of the sub-array antennas that have further higher reliability, can be estimated.

The radar device 2 according to the Embodiment 3 of the present invention includes the antenna specification estimation device 1 according to the Embodiment 3 of the present invention and the radar operation module 32 for operating radar using parameters estimated by the information estimator 24A of the antenna specification estimation device 1. With this configuration, there can be obtained an effect of acquiring parameters such as arrangement information and a transmission phase of a plurality of correction target sub-array antennas without arranging a reference signal transmission source highly accurately, even when a sub-array antenna is added or moved in the distributed array antenna, so that a radar operation can be smoothly performed.

Embodiment 4

In the Embodiments 1 to 3, the correction of reception sub-array antennas 6 has been described. In contrast, in the present embodiment, by applying a Multi input Multi Output (MIMO) radar technique to the Embodiments 1 to 3, correction information pieces being parameters of transmission sub-array antennas 5 are estimated as well as the reception sub-array antennas 6.

Figure 6:
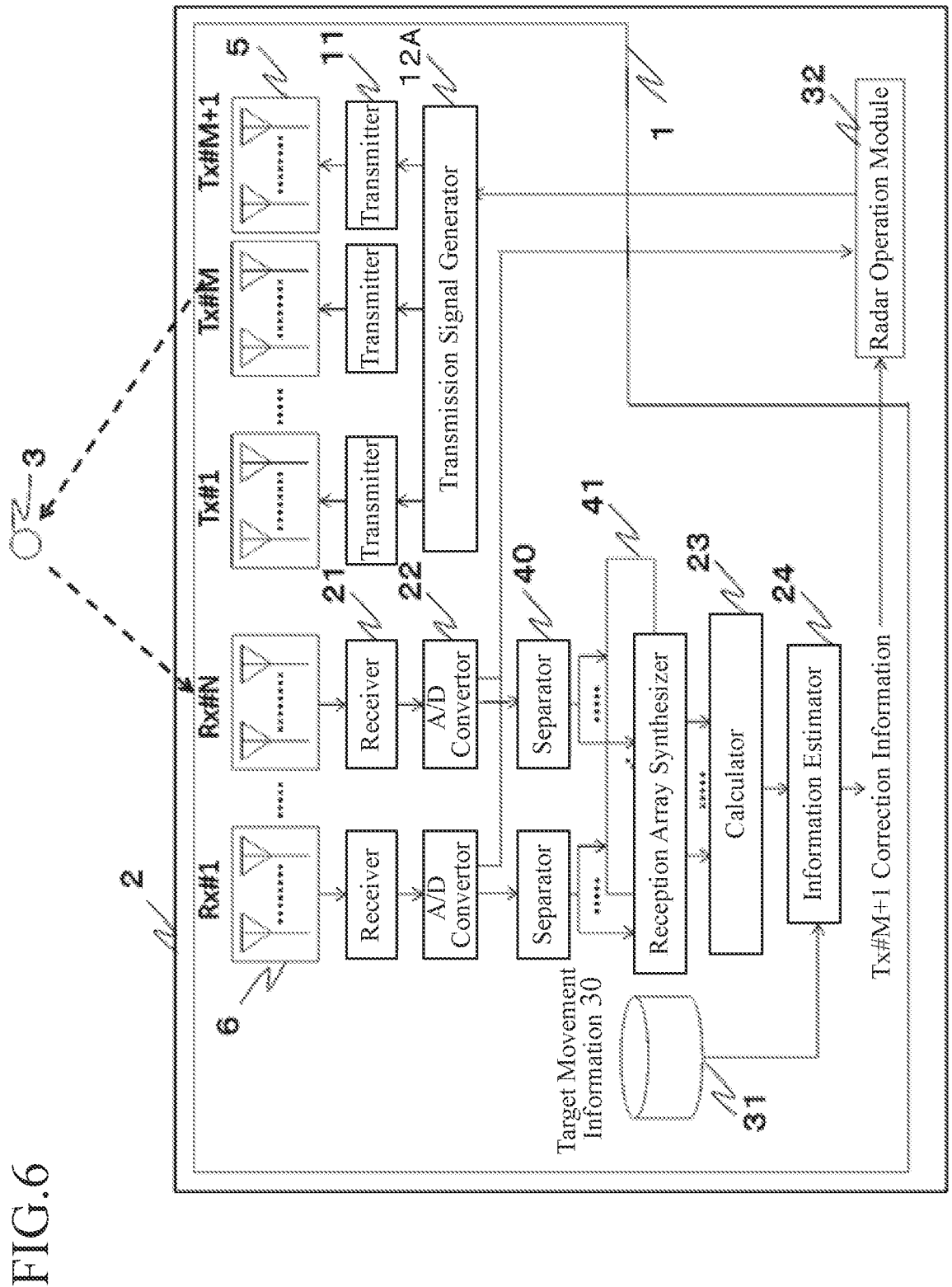
FIG. 6 is a configuration of an antenna specification estimation device 1 and a radar device 2 according to Embodiment 4 of the present invention.

An antenna specification estimation device 1 and a radar device 2 according to Embodiment 4 of the present invention will be described with reference to FIGS. 6 and 7. FIG. 6 illustrates a configuration of the antenna specification estimation device 1 and the radar device 2 according to the Embodiment 4 of the present invention. In the diagrams, the same signs denote the same or corresponding parts.

In FIG. 6, the antenna specification estimation device 1 and the radar device 2 of the present invention are constituted by a reception array and a transmission array. The transmission array is constituted by M+1 transmission sub-array antennas 5. Transmission signals different for each sub-array antenna are generated by a transmission signal generator 12A, subjected to frequency conversion, amplification, and the like, that are performed by a transmitter 11 as necessary, and then, emitted from each of the transmission sub-array antennas 5 toward a mobile target 3. Signals reflected by the mobile target 3 are received by the reception array constituted by N reception sub-array antennas 6, subjected to amplification and frequency conversion that are performed by a receiver 21 as necessary, and then, subjected to A/D conversion performed by an A/D convertor 22 to generate a digital signal. In each reception sub-array antenna 6, a separator 40 separates a reception signal into signal components corresponding to each transmission sub-array antenna 5 by using the above-described difference in transmission signals among the transmission sub-array antennas 5. A reception array synthesizer 41 performs, among the reception sub-array antennas 6, weighed synthesis of signal components corresponding to the same transmission sub-array antenna 5. A calculator 23 calculates information of relative amplitude and phase of signal components corresponding to each transmission sub-array antenna 5 that is obtainable after the reception array synthesis. An information estimator 24 estimates correction information being a parameter of a correction target M+1th transmission sub-array antenna 5 by using relative amplitude and phase information pieces corresponding to a plurality of observations that have been calculated by the calculator 23 and also using target movement information pieces 30 corresponding to the plurality of observations that are stored in an information storage 31.

In the Embodiment 4, correction information pieces being parameters of transmission sub-array antennas 5 are also estimated in addition to the reception sub-array antennas 6 by applying the MIMO radar technique to each of the above-described embodiments. The description will be given using a flowchart in FIG. 7 of the antenna specification estimation device 1 and the radar device 2 according to the Embodiment 4 of the present invention.

Figure 7:
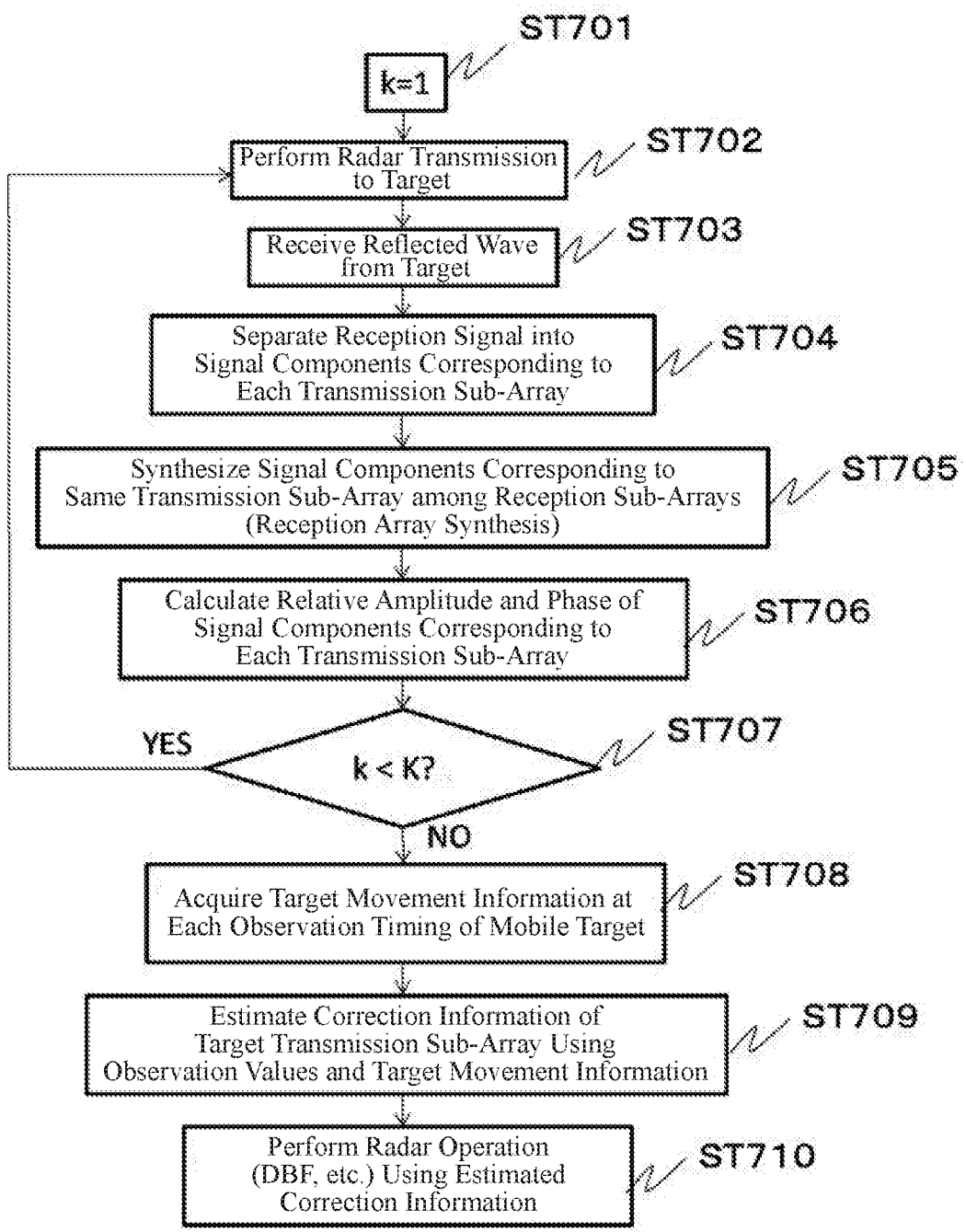
FIG. 7 is a flowchart of the antenna specification estimation device 1 and the radar device 2 according to the Embodiment 4 of the present invention.

Also in the Embodiment 4, as described in FIG. 7, a plurality of times of observations are executed. The MIMO radar technique is applied to the plurality of times of observations. In other words, the transmission signal generator 12A in FIG. 6 generates transmission signals being different for each transmission sub-array antenna 5, so that signal separation can be performed in signal processing performed after the reception.

For example, in a method called encoding MIMO radar, a transmission signal is encoded for each transmission sub-array antenna 5 by using an orthogonal code. For the (k=1)th observation (ST701), a transmission signal encoded for each transmission sub-array antenna 5 using an orthogonal code is transmitted to the mobile target 3 (ST702), and a reflected wave from the mobile target 3 is received by each reception sub-array antenna 6 (ST703). By performing matched filter (MF) processing and performing demodulation for each code after the reception, signal components corresponding to each transmission sub-array antenna 5 are separated and extracted (ST704).

In a case where a time division MIMO radar is applied, individual transmission timings of the transmission sub-array antennas 5 are shifted so that signal separation on a time axis can be performed at the reception side. In a case of a frequency division MIMO radar, carrier frequencies differing for each transmission sub-array antenna 5 are used, and signal separation is performed on a frequency axis after the reception.

Any of the various MIMO radar methods described above is used in the Embodiment 4, and transmission signal generation corresponding to the method is performed by the transmission signal generator 12A shown in FIG. 6.

After the AD conversion of a reception signal is performed for each reception sub-array antenna 6 for each observation, signal separation processing corresponding to each transmission sub-array antenna 5 is performed (ST704). As described above, separation processing corresponding to a used MIMO radar method is executed.

After that, among the reception sub-array antennas 6, weighed synthesis of signal components corresponding to the same transmission sub-array antenna 5 is performed (ST705). In the MIMO radar, a signal component of N*(M+1) obtained by the signal separation indicates a product of a combination of mutually different transmission/reception sub-array antenna signals. Performing, to such signals, weighted synthesis of signal components corresponding to the same transmission sub-array antenna 5 is equivalent to performing signal synthesis for the reception array, and M+1 signal components consequently obtained as outputs thereof become signal components corresponding to each transmission sub-array antenna 5. This is characteristics of a general MIMO radar.

After that, similarly to the Embodiments 1 to 3, relative amplitude and phase y(k) of signals is calculated (ST706). A difference from the above-described embodiments lies in that relative amplitude and phase obtained as calculation results are those of transmission sub-array antennas 5. The observation processing from ST702 to ST707 is performed K times (ST707).

After that, the target movement information 30 at each observation timing of the mobile target 3 that is stored in the information storage 31 is acquired (ST708). By using separately-acquired target movement information 30 and relative amplitude and phase y(k) of signals, correction information being a parameter of a correction target (M+1)th transmission sub-array antenna 5 is estimated in a process similar to that in the Embodiments 1 to 3 (ST709). Note that, a steering vector $a'(\theta_k, \varphi_k, \xi)$ to be used is not the one for the reception array, but for the transmission array.

The estimated correction information being the parameter of the transmission sub-array antenna 5 is used in radar operation similarly to the other embodiments (ST710). The estimated correction information can be utilized for, as well as the beam directionality control of transmission sub-array antennas, the weighted calculation or the like in the DBF processing that uses a virtual array of MIMO during operation of MIMO radar processing.

FIGS. 6 and 7 describe a case of correcting a single transmission sub-array antenna 5. Alternatively, similarly to the Embodiments 2 and 3 in the correction of the reception sub-array antennas 6, a plurality of transmission sub-array antennas 5 can be used as correction targets, and correction information pieces of them can be of course estimated simultaneously or sequentially.

As described above, the antenna specification estimation device 1 according to the Embodiment 4 of the present invention includes: the transmission array antenna having a plurality of transmission sub-array antennas 5 which transmit mutually different signals to a mobile entity as the mobile target 3 existing independently of the antenna specification estimation device 1; the reception antenna to receive signals reflected from the mobile target 3 with respect to the mutually different signals transmitted to the mobile target 3; the calculator 23 to calculate amplitude phase information indicating amplitude and phases in the plurality of transmission sub-array antennas 5 by using mutually different signals received by the reception antenna; the information storage 31 to store position information of the mobile target 3, the position information changing with time; and the information estimator 24 to estimate a parameter of a sub-array antenna included in the plurality of transmission sub-array antennas 5 by using the phase information calculated by the calculator 23 and the position information of the mobile entity which changes with time and is stored in the information storage 31. According to the antenna specification estimation device 1 of the present invention, antenna specifications being parameters such as the arrangement relation and transmission phase of the transmission sub-array antennas 5 being sub-array antennas constituting a distributed array antenna can be estimated with lower load than that in conventional techniques, without installing a transmission source of reference radio waves. In particular, there is obtained an effect of acquiring arrangement information and a transmission phase of correction target sub-array antennas, without arranging a reference signal transmission source highly accurately, even when a transmission sub-array antenna 5 being a sub-array antenna is added or moved in the distributed array antenna.

In addition, in the antenna specification estimation device 1 according to the Embodiment 4 of the present invention, each of the plurality of sub-array antennas included in the transmission array antenna transmits a signal to the mobile entity 3 a plurality of times, the reception antenna receives a reflected signal from the mobile entity 3 that corresponds to the signal transmitted to the mobile entity 3 the plurality of times, a plurality of times, the amplitude phase information calculated by the calculator 23 is amplitude phase information pieces corresponding to a plurality of times that indicate the amplitude and phase in the plurality of sub-array antennas that correspond to signals received by the reception array antenna the plurality of times, the temporally-changing position information of the mobile entity 3 that is stored in the information storage 31 is position information pieces corresponding to a plurality of times of the mobile entity 3 that correspond to reception times of signals received the plurality of times, and the information estimator 24 uses the amplitude phase information pieces corresponding to the plurality of times, as the amplitude phase information calculated by the calculator 23, uses the position information pieces corresponding to the plurality of times, as the position information stored in the information storage 31, and estimates a parameter of a sub-array antenna included in the plurality of sub-array antennas, based on consistency of relation between the amplitude phase information pieces corresponding to the plurality of times and the position information pieces corresponding to the plurality of times. In this manner, by using reception results of signals of a plurality of times, antenna specifications being parameters such as the arrangement relation and transmission phase of the transmission sub-array antenna 5 being a sub-array antenna can be estimated highly accurately while considering transfer of the mobile entity 3.

In addition, in the antenna specification estimation device 1 according to the Embodiment 4 of the present invention, the reception sub-array antennas 6 being a plurality of sub-array antennas included in the reception array antenna, and the transmission sub-array antennas 5 being a plurality of sub-array antennas included in the transmission array antenna include the same sub-array antenna. In other words, the reception sub-array antennas 6 and the transmission sub-array antennas 5 include a sub-array antenna which is used in common for transmission and reception. With this configuration, as compared with a case in which all of the transmission sub-array antennas 5 and the reception sub-array antennas 6 are separately arranged, the transmission sub-array antennas 5 and the reception sub-array antennas 6 can be arranged in a smaller arrangement space, and a device scale can be made smaller.

In addition, the radar device 2 according to the Embodiment 4 of the present invention includes the antenna specification estimation device 1 according to the Embodiment 4 of the present invention, and the radar operation module 32 for operating radar using a parameter estimated by the information estimator 24 of the antenna specification estimation device 1. With this configuration, estimation results of antenna specifications being parameters such as the arrangement relation and transmission phase of the transmission sub-array antenna 5 being a sub-array antenna that have been acquired with lower load than that in conventional techniques can be used in radar operation.

In addition, in the radar device 2 according to the Embodiment 4 of the present invention, a plurality of times of radar observations are performed on the mobile target 3 while using the MIMO radar processing, relative amplitude and phase information of the transmission sub-array antennas 5 in each observation is acquired, the target movement information 30 corresponding to the radar observation that is stored in the information storage 31 is also be separately acquired, and using both pieces of information, the arrangement information and transmission phase of a correction target transmission sub-array antenna 5 are estimated, and the estimation result is used in radar operation.

With this configuration, there is obtained an effect of acquiring arrangement information and a transmission phase of the correction target transmission sub-array antenna 5 without arranging a reference signal transmission source highly accurately, even when a sub-array antenna is added or moved in the distributed array antenna.

Embodiment 5

In the Embodiments 1 to 4, the correction of the reception sub-array antennas 6 is performed by using reception signals received by the reception sub-array antennas 6. In contrast, in the present embodiment, the description will be given of a configuration of performing detection processing using radar signal processing on reception signals received by reception sub-array antennas 6, and then performing correction of the reception sub-array antennas 6 by using a result of the detection processing.

Figure 8:
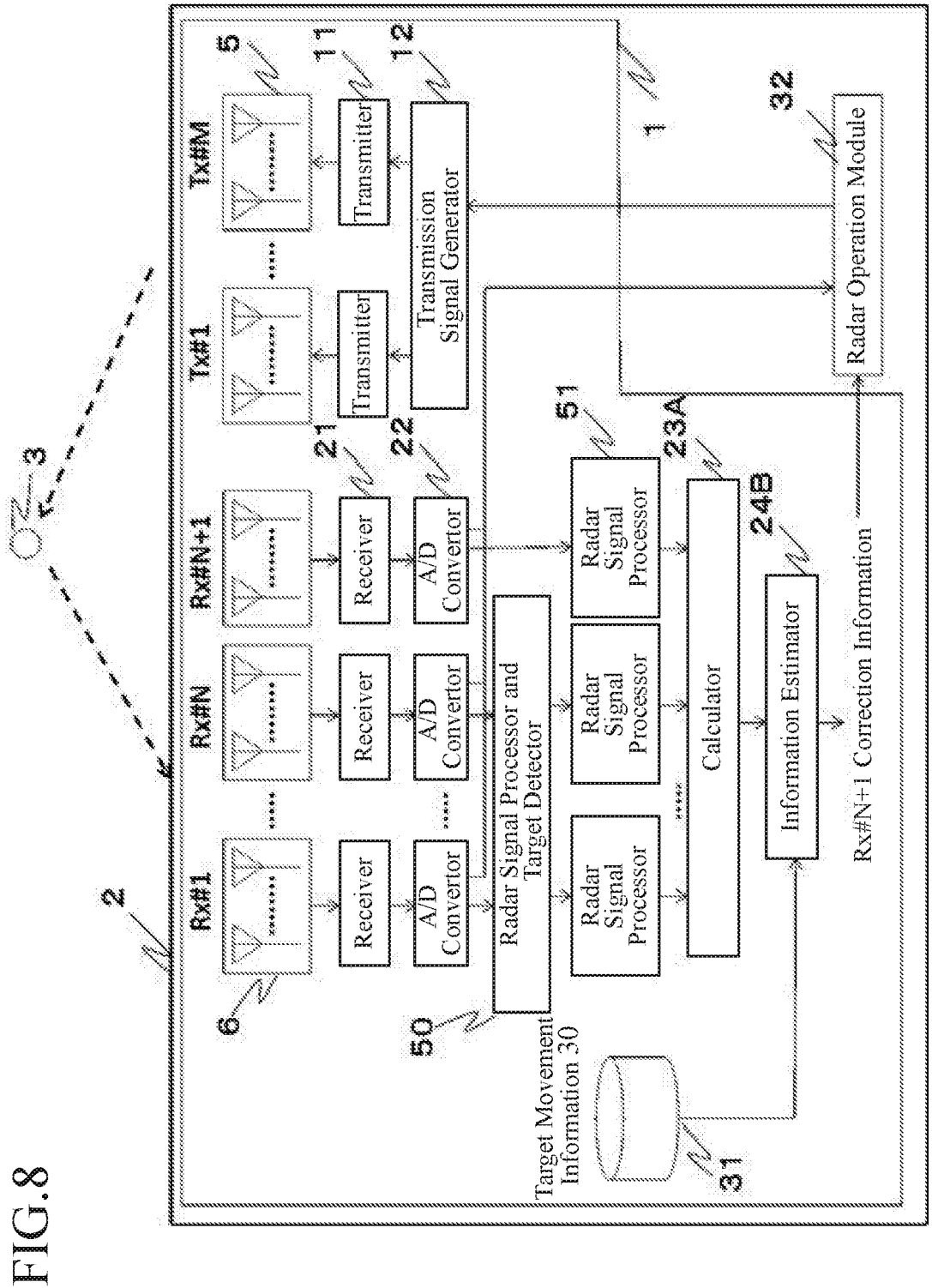
FIG. 8 is a configuration diagram of an antenna specification estimation device 1 and a radar device 2 according to Embodiment 5 of the present invention.

An antenna specification estimation device 1 and a radar device 2 according to Embodiment 5 of the present invention will be described with reference to FIGS. 8 and 9. FIG. 8 illustrates a configuration of the antenna specification estimation device 1 and the radar device 2 according to the Embodiment 5 of the present invention. In addition, in the diagrams, the same signs denote the same or corresponding parts.

In FIG. 8, the antenna specification estimation device 1 and the radar device 2 of the present invention are constituted by a reception array and a transmission array. The transmission array is constituted by M transmission sub-array antennas 5. A transmission signal generated by a transmission signal generator 12 is subjected to frequency conversion, amplification, and the like that are performed by a transmitter 11 as necessary, and then, emitted from each of the transmission sub-array antennas 5 toward a mobile target 3. Signals reflected by the mobile target 3 are received by the reception array constituted by N+1 reception sub-array antennas 6, subjected to amplification and frequency conversion that are performed by a receiver 21 as necessary, and then, subjected to A/D conversion performed by an A/D convertor 22 to generate a digital signal. A radar signal processor and target detector 50 performs general radar signal processing of generating a Range-Doppler (RD) map by performing radar signal processing such as reception array synthesis, pulse compression, and pulse integration on reception signals of the first to the N-th reception sub-array antennas 6, and detects the mobile target 3 on the RD map. A radar signal processor 51 performs similar processing in each reception sub-array antenna 6 to generate an RD map of each reception sub-array antenna 6. A calculator 23A extracts amplitude and phase information of an RD bin on the RD map of each of the reception sub-array antennas 6. In the RD bin, the mobile target 3 has been detected by the radar signal processor and target detector 50. An information estimator 24B extracts, from among amplitude and phase information pieces corresponding to a plurality of observations that have been calculated by the calculator 23A, only information having consistency with the target movement information pieces 30 corresponding to the plurality of observations that are stored in the information storage 31, and estimates correction information being a parameter of the (N+1)th reception sub-array antenna 6 as a correction target by using the extracted amplitude and phase information and the target movement information pieces 30 stored in the information storage 31.

The Embodiment 5 will be described using a flowchart in FIG. 9 that illustrates processing of the antenna specification estimation device 1 and the radar device 2 according to the Embodiment 5 of the present invention. In FIG. 9, similarly to the Embodiment 1, a plurality of times of radar observations are executed. A difference from the Embodiment 1 lies in that, detection processing using radar signal processing is applied to reception signals converted into digital signals that have been received by the reception sub-array antennas 6.

Figure 9:
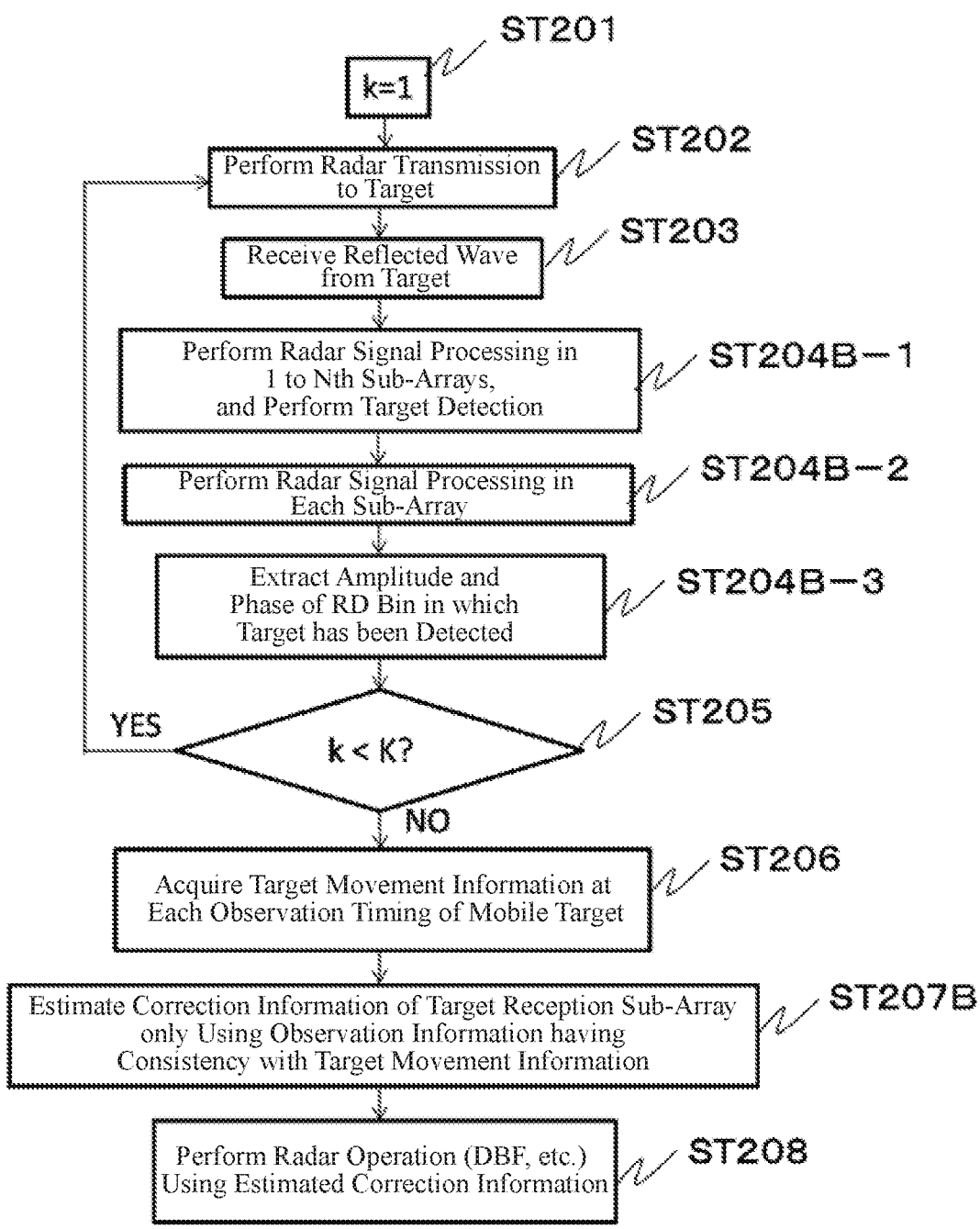
FIG. 9 is a flowchart illustrating processing of the antenna specification estimation device 1 and the radar device 2 according to the Embodiment 5 of the present invention.

As described in FIG. 9, in the Embodiment 5, radar signal processing using reception signals of the first to the N-th reception sub-array antennas 6 and target detection are performed (ST204B-1). Specifically, pulse compression, pulse integration, and reception array synthesis of the reception signals of the first to the N-th reception sub-array antennas 6 are performed. As a result, a single RD map is created from the reception signals of the first to the N-th reception sub-array antennas 6, threshold processing is performed on the RD map, and an RD bin in which the mobile target 3 exists (target position information on a Range-axis and a Doppler-axis is detected.

Subsequently, the radar signal processing (pulse compression and pulse integration) is executed in each reception sub-array antenna 6, and an RD map of each reception sub-array antenna 6 is generated (ST204B-2). Here, signal synthesis among reception sub-array antennas 6 is not performed, and an RD map of an individual reception sub-array antenna 6 is generated.

Target information is extracted from the RD map of each of the reception sub-array antennas 6 (ST204B-3). At this time, by using information of an RD bin in which the mobile target 3 has been detected by reception signals of the first to the N-th reception sub-array antennas 6 of the previous stage, amplitude and phase information of a target detection RD bin of the RD map of each reception sub-array antenna 6 is extracted. By performing target detection in the first to the N-th reception sub-array antennas 6 as preprocessing in this manner, the target detection can be performed in a state where a favorable signal to noise ratio (SNR) is obtained. This state is capable of bringing an effect of avoiding erroneous detection of the mobile target 3.

The above process is repeated for each of the plurality of observations to extract amplitude and phase information of a target detection RD bin of each reception sub-array antenna 6.

After the plurality of times of observations are finished, the target movement information 30 (target position and speed) corresponding to each observation timing that is stored in the information storage 31 is acquired similarly to the other embodiments. By using the target movement information 30 and amplitude and phase information pieces of target detection RD bins corresponding to the plurality of observations, correction information pieces being parameters of correction target reception sub-array antennas 6 are estimated. However, in the Embodiment 5, unlike the other embodiments, not all the observation information pieces are used. As shown in FIG. 9, only observation information having consistency with the target movement information 30 stored in the information storage 31 is used (ST207B). Specifically, when a target position and a target speed as the target movement information 30 has already been acquired, the values of a Range and a Doppler of the mobile target 3 at individual observation timing can be calculated therefrom. The calculation values and information of an RD bin obtainable at the time of the target detection are compared, and then only observation values whose calculation values are within a range of the RD bin is used for the estimation processing of correction information. In this manner, by extracting only an observation value having consistency with a target movement, there can be obtained an effect of preventing an observation value not being a target reflected signal from being erroneously used in the estimation of correction information, and estimation accuracy of correction information from being deteriorated.

The estimation of correction information that uses a plurality of extracted observation values and the application of the correction information to radar operation are performed, similarly to the other embodiments.

In addition, FIGS. 8 and 9 illustrate a case where there is a single correction target sub-array antenna. Alternatively, the configuration of the Embodiment 5 can be easily applied to a case in which a plurality of sub-array antennas are used as correction targets similarly to the Embodiments 2 and 3, and such a case is included in the scope of the present invention.

In FIGS. 8 and 9, the description has been given of a case in which the reception sub-array antennas 6 are used as correction targets. Alternatively, the Embodiment 5 can be easily applied to a case in which the transmission sub-array antennas 5 are used as correction targets similarly to the Embodiment 4, and such a case is included in the scope of the present invention.

As described above, the antenna specification estimation device 1 according to the Embodiment 5 of the present invention includes the radar signal processor and target detector 50 and radar signal processor 51 that serve as a signal processor for generating a Range-Doppler map using a signal received by a reception array antenna, or a reception sub-array antenna 6 included in the reception antenna, and extracting a signal corresponding to the mobile target 3 being a mobile entity, using the generated Range-Doppler map, and the information estimator 24B estimates a parameter of a transmission sub-array antenna 5 or a reception sub-array antenna 6 that is a sub-array antenna included in the plurality of sub-array antennas, using the signal extracted by the signal processor.

With this configuration, there can be obtained an effect of acquiring arrangement information and a transmission phase of a correction target sub-array antenna, without arranging a reference signal transmission source highly accurately, and while avoiding erroneously using a signal that is not a target reflected wave, in the estimation of correction information, even when a sub-array antenna is added or moved in the distributed array antenna.

In addition, according to the radar device 2 according to the Embodiment 5 of the present invention, a plurality of times of radar observation are performed on the mobile target 3, target detection is performed on an RD map generated by performing radar signal processing that uses the first to the N-th sub-array antennas that are not correction targets, radar signal processing is further performed in each sub-array antenna, to generate an RD map of each sub-array antenna, amplitude and phase information is acquired from a target detection RD bin of an RD map of each sub-array antenna using the target detection information, the target movement information 30 corresponding to the radar observation that is stored in the information storage 31 is separately acquired, amplitude and phase information having consistency is extracted by comparing the target movement information 30 and the target detection RD bin, arrangement information and a transmission phase of a correction target sub-array antenna is estimated using the target movement information 30 and the extracted amplitude and phase information, and the estimation result is used in radar operation.

With this configuration, radar operation can be performed using highly-accurate parameters such as arrangement information and a transmission phase of an acquired correction target sub-array antenna, while avoiding using a signal that is not a target reflected wave, in the estimation of correction information.

Embodiment 6

In the Embodiment 5, target detection is performed by radar signal processing. In contrast, the present embodiment discloses a configuration of detecting a target by using the target movement information 30 stored in the information storage 31 and performing correction processing.

Figure 10:
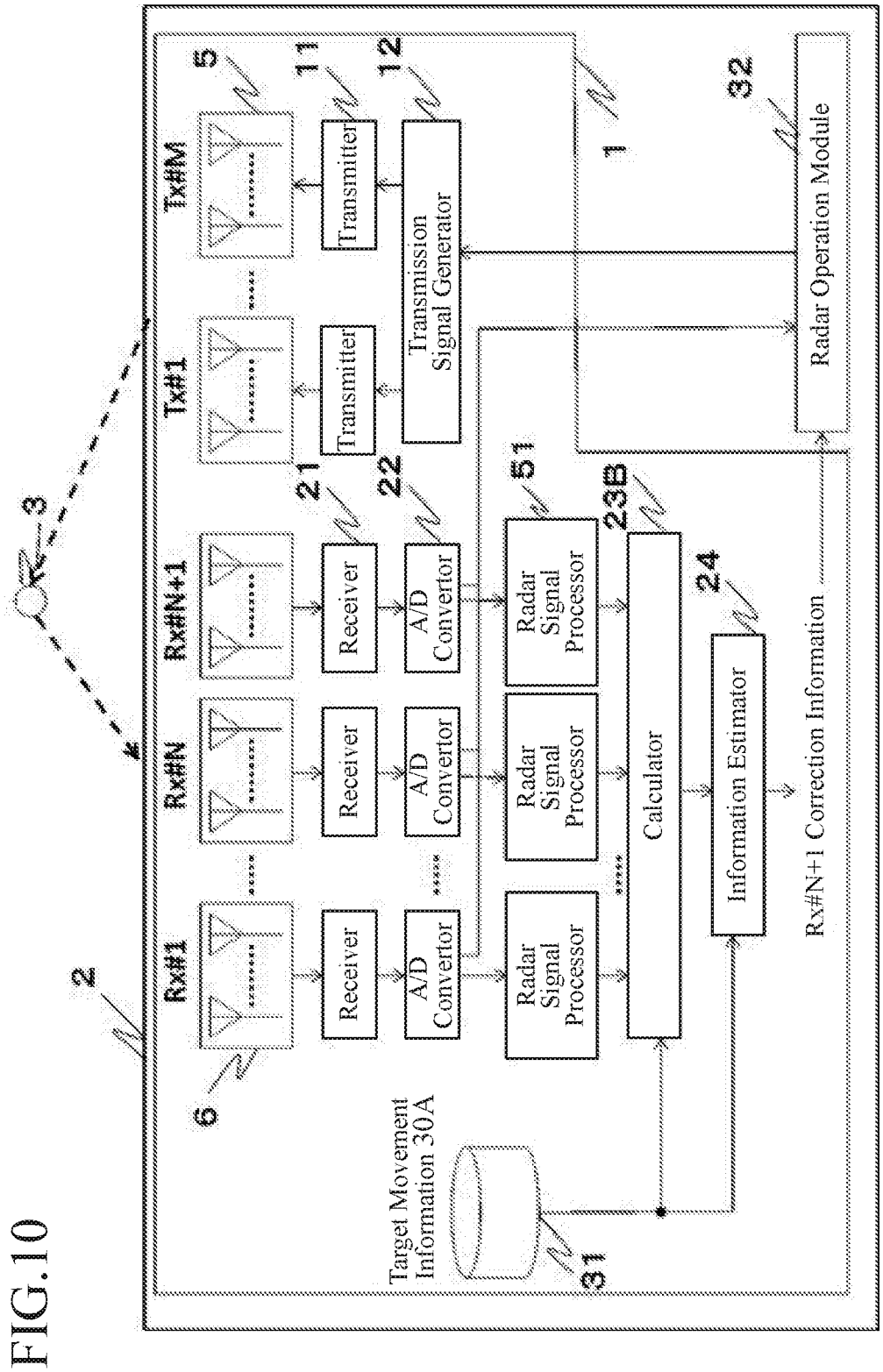
FIG. 10 is a configuration diagram of an antenna specification estimation device 1 and a radar device 2 according to Embodiment 6 of the present invention.

An antenna specification estimation device 1 and a radar device 2 according to Embodiment 6 of the present invention will be described with reference to FIGS. 10 and 11. FIG. 10 illustrates a configuration of the antenna specification estimation device 1 and the radar device 2 according to the Embodiment 6 of the present invention. In the diagrams, the same signs denote the same or corresponding parts.

In FIG. 10, the antenna specification estimation device 1 and the radar device 2 of the present invention are constituted by a reception array and a transmission array. The transmission array is constituted by M transmission sub-array antennas 5. A transmission signal generated by a transmission signal generator 12 is subjected to frequency conversion, amplification, and the like, that are performed by a transmitter 11 as necessary, and then, emitted from each of the transmission sub-array antennas 5 toward a mobile target 3. Signals reflected by the mobile target 3 are received by the reception array constituted by N+1 reception sub-array antennas 6, subjected to amplification and frequency conversion that are performed by a receiver 21 as necessary, and then, subjected to A/D conversion performed by an A/D convertor 22 to generate a digital signal. A radar signal processor 51 performs processing such as pulse compression and pulse integration in each reception sub-array antenna 6 to generate an RD map of each reception sub-array antenna 6. A calculator 23B calculates an RD bin of the mobile target 3 from target movement information 30A acquired in real time, and extracts amplitude and phase information of the calculation RD bin. An information estimator 24 estimates correction information being a parameter of a correction target (M+1)th transmission sub-array antenna 5, using relative amplitude and phase information pieces corresponding to a plurality of observations that have been calculated by the calculator 23B, and target movement information pieces 30A corresponding to the plurality of observations.

Next, the Embodiment 6 will be described using a flowchart in FIG. 11 that illustrates processing of the antenna specification estimation device 1 and the radar device 2 according to the Embodiment 6 of the present invention. As described in FIG. 11, in the Embodiment 6, concurrently with a plurality of times of radar observations, target movement information 30 is acquired in ST204C-1. In the other embodiments, the target movement information 30 is used after a plurality of times of radar observations. In contrast, in the Embodiment 6, the target movement information 30 stored in the information storage 31 is used when each radar observation is performed (ST204C-1).

In the Embodiment 6, similarly to the Embodiment 5, radar signal processing is performed in each reception sub-array antenna 6 (ST204C-2), an RD map is generated, and amplitude and a phase of an RD bin of each sub-array antenna in which the mobile target 3 exists is extracted (ST204C-3). Note that, in the configuration, detection processing of the mobile target 3 as in the Embodiment 5 is not performed, and the target movement information 30 stored in the information storage 31 is used. Specifically, processing of generating an RD map in each reception sub-array antenna 6, calculating an RD bin in which the mobile target 3 exists, from the target movement information 30 stored in the information storage 31, and extracting amplitude and a phase of the RD bin is performed for each radar observation.

By using the amplitude and phase information extracted in the above-described manner, and the target movement information 30 stored in the information storage 31, observation values and the target movement information 30 are used similarly to the other embodiments, and correction information being a parameter of a target transmission sub-array antenna 5 is estimated (ST207C). As a result, an observation value that is not a target reflected signal can be prevented from being erroneously used in the estimation of correction information, and estimation accuracy of the correction information can be prevented from being deteriorated.

Figure 11:
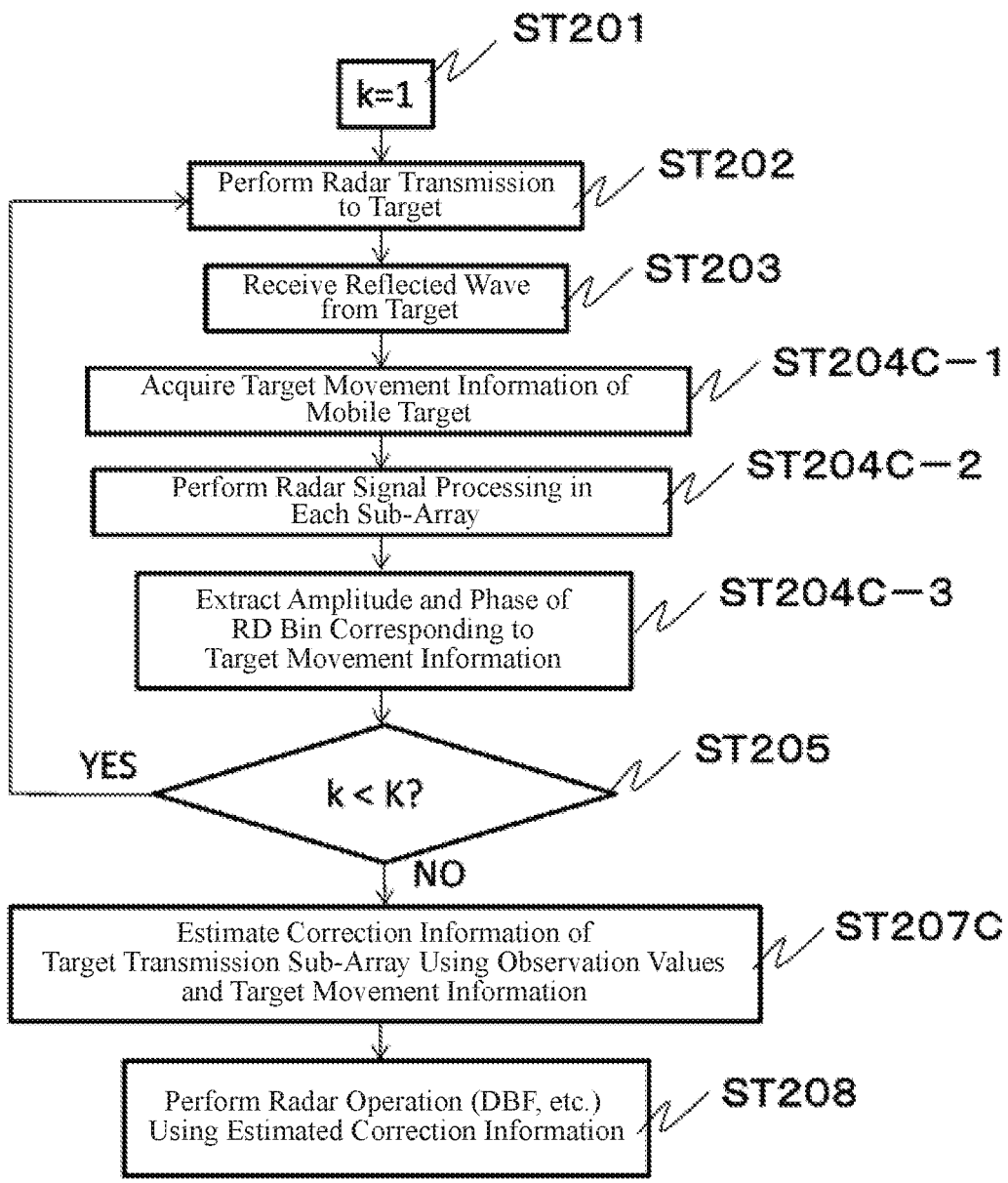
FIG. 11 is a flowchart illustrating processing of the antenna specification estimation device 1 and the radar device 2 according to the Embodiment 6 of the present invention.

In addition, FIGS. 10 and 11 illustrate a case where there is a single correction target sub-array antenna. Alternatively, the configuration of the Embodiment 6 can be easily applied to a case in which a plurality of sub-array antennas are used as correction targets similarly to the Embodiments 2 and 3, and such a case is included in the scope of the present invention.

In addition, in FIGS. 10 and 11, the description has been given of a case in which the reception sub-array antennas 6 are used as correction targets. Alternatively, the Embodiment 6 can be easily applied to a case in which the transmission sub-array antennas 5 are used as correction targets similarly to the Embodiment 4, and such a case is included in the scope of the present invention.

As described above, according to the radar device 2 according to the Embodiment 6 of the present invention, a plurality of times of radar observations are performed on the mobile target 3, radar signal processing is performed in each sub-array antenna to generate an RD map of each sub-array antenna, amplitude and phase information of a target RD bin that has been calculated from the target movement information 30 separately acquired in real time is acquired, the arrangement information and transmission phase of a correction target sub-array antenna are estimated using the target movement information 30 and the extracted amplitude and phase information, and the estimation result is used in radar operation.

With this configuration, there can be obtained an effect of acquiring arrangement information and a transmission phase of a correction target sub-array antenna, without arranging a reference signal transmission source highly accurately, and while avoiding erroneously using a signal that is not a target reflected wave, in the estimation of correction information, even when a sub-array antenna is added or moved in the distributed array antenna.

Meanwhile, in the description of each embodiment of the present invention, the transmission sub-array antennas 5 and the reception sub-array antennas 6 in FIG. 1 are separately formed, that is, formed as transmission-reception separate type radar. Alternatively, all or part of sub-array antennas may be formed for transmission and reception common use.

In addition, in some cases, each sub-array antenna is a fixed antenna. In other cases, each sub-array antenna is formed as an antenna included in a mobile entity.

Furthermore, in the above-description, the case of using a radio wave as a wave motion has been described. Nevertheless, the present invention can be applied to a system that uses other wave motions, for example, ultrasonic waves.

Embodiment 7

In the Embodiments 1 to 6, the processing in the antenna specification estimation device 1 and the radar device 2 are employed. Alternatively, the same processing as that in the Embodiments 1 to 6 can be applied to a wireless device such as a wireless communication base station, aside from radar signals.

REFERENCE SIGNS LIST

1: Antenna specification estimation device, 2: Radar device, 3: Mobile target, 5: Transmission sub-array antenna, 6: Reception sub-array antenna, 11: Transmitter, 12: Transmission signal generator, 21: Receiver, 22: A/D convertor, 23 and 23A: Calculator, 24, 24A, and 24B: Information estimator, 30 and 30A: Target movement information: Information storage, 32: Radar operation module, 40: Separator, 41: Reception array synthesizer, 50: Radar signal processor and target detector, 51: Radar signal processor

The invention claimed is:
1. An antenna specification estimation device comprising:
a transmission antenna to transmit a signal to a mobile entity existing independently of the antenna specification estimation device;
a reception array antenna having a plurality of sub-array antennas each of which receives a signal reflected from the mobile entity;
a calculator to calculate amplitude phase information indicating amplitude and phases of the signal received by the reception array antenna, the amplitude and the phases being observed in the sub-array antennas, pieces of amplitude phase information being obtained by each of the plurality of sub-array antennas observing the mobile entity from a different angle toward the mobile entity;

an information storage to store pieces of position information of the mobile entity, the position of the mobile entity changing with time; and an information estimator to estimate a parameter of a sub-array antenna included in the plurality of sub-array antennas by determining a consistent relationship between the amplitude phase information pieces calculated by the calculator and the position information pieces stored in the information storage, wherein the parameter of the sub-array antenna indicates
- a position coordinate of the sub-array antenna, or
- an aperture plane direction of the sub-array antenna, or
- a phase component of the sub-array antenna, or
- a combination of any two of the position coordinate, the aperture plane direction, and the phase component, or
- all of the position coordinate, the aperture plane direction, and the phase component.

2. The antenna specification estimation device according to claim 1, wherein the reception array antenna receives the reflected signal from the mobile entity a plurality of times, the amplitude phase information calculated by the calculator is amplitude phase information pieces for the plurality of times, each of which indicates amplitude and phases of the signal received by the reception array antenna, the amplitude and the phases being observed in the sub-array antennas, the position information of the mobile entity stored in the information storage is position information pieces of the mobile entity for the plurality of times, which correspond to time points of receiving signals the plurality of times, and the information estimator estimates the parameter of the sub-array antenna included in the plurality of sub-array antennas on a basis of consistency of relation between amplitude phase information pieces for the plurality of times and position information pieces for the plurality of times, the phase information calculated by the calculator being used as the phase information pieces for the plurality of times, the position information stored in the information storage being used as the position information pieces for the plurality of times.

3. An antenna specification estimation device comprising:

a transmission array antenna having a plurality of sub-array antennas which transmit mutually different signals to a mobile entity existing independently of the antenna specification estimation device;

a reception antenna to receive signals reflected from the mobile entity with respect to the mutually different signals transmitted to the mobile entity;

a calculator to calculate amplitude phase information indicating amplitude and phases in the plurality of sub-array antennas by using mutually different signals received by the reception antenna, pieces of amplitude phase information being obtained by each of the plurality of sub-array antennas observing the mobile entity from a different angle toward the mobile entity;

an information storage to store pieces of position information of the mobile entity, the position of the mobile entity changing with time; and an information estimator to estimate a parameter of a sub-array antenna included in the plurality of sub-array antennas by determining a consistent relationship between the amplitude phase information pieces calculated by the calculator and the position information pieces of the mobile entity stored in the information storage, wherein the parameter of the sub-array antenna indicates
- a position coordinate of the sub-array antenna, or
- an aperture plane direction of the sub-array antenna, or
- a phase component of the sub-array antenna, or
- a combination of any two of the position coordinate, the aperture plane direction, and the phase component, or
- all of the position coordinate, the aperture plane direction, and the phase component.

4. The antenna specification estimation device according to claim 3, wherein each of the plurality of sub-array antennas included in the transmission array antenna transmits a signal to the mobile entity a plurality of times, the reception antenna receives signals reflected from the mobile entity with respect to the signal transmitted to the mobile entity the plurality of times, the amplitude phase information calculated by the calculator is amplitude phase information pieces for a plurality of times, which indicate amplitude and phases in the plurality of sub-array antennas with respect to signals received by the reception antenna the plurality of times, the position information of the mobile entity stored in the information storage is position information pieces of the mobile entity for the plurality of times, which correspond to time points of receiving signals the plurality of times, and the information estimator estimates the parameter of the sub-array antenna included in the plurality of sub-array antennas on a basis of consistency of relation between the amplitude phase information pieces for the plurality of times and the position information pieces for the plurality of times, the amplitude phase information pieces for the plurality of times being used as the amplitude phase information calculated by the calculator, the position information pieces for the plurality of times being used as the position information stored in the information storage.

5. The antenna specification estimation device according to claim 1, wherein the information estimator simultaneously estimates parameters of two or more sub-array antennas included in the plurality of sub-array antennas.

6. The antenna specification estimation device according to claim 1, wherein the information estimator sequentially estimates, for each sub-array antenna, parameters of two or more sub-array antennas included in the plurality of sub-array antennas.

7. The antenna specification estimation device according to claim 6, wherein the information estimator estimates again, after estimating the parameters of two or more sub-array antennas included in the plurality of sub-array antennas has been completed, parameters of the two or more sub-array antennas on which the estimation has been completed.

8. The antenna specification estimation device according to claim 1, wherein the position information of the mobile entity, which changes with time and is stored in the information storage, is acquired from GPS information of a mobile entity equipped with a GPS receiver, or information of an ADS-B equipped in an aircraft, or information of an AIS equipped in a ship.

9. The antenna specification estimation device according to claim 1, further comprising a signal processor to generate a Range-Doppler map by using the signal received by the reception array antenna or the reception antenna, and extract a signal corresponding to the mobile entity by using the generated Range-Doppler map,
wherein the information estimator estimates the parameter of a sub-array antenna included in the plurality of sub-array antennas by using the signal extracted by the signal processor.

10. A radar device comprising:
the antenna specification estimation device according to claim 1; and
a radar operation module to operate radar by using the parameter estimated by the information estimator of the antenna specification estimation device.

11. The antenna specification estimation device according to claim 1, wherein
the transmission antenna has a plurality of sub-array antennas which transmit signals different from each other to the mobile entity, and
the sub-array antennas of the transmission antenna and the sub-array antennas of the reception antenna include a sub-array antenna which is used in common for transmission and reception.

12. The antenna specification estimation device according to claim 3, wherein
the reception antenna has a plurality of sub-array antennas which receive signals reflected from the mobile entity, and
the sub-array antennas of the transmission antenna and the sub-array antennas of the reception antenna include a sub-array antenna which is used in common for transmission and reception.

* * * * *